United States Patent
Greco et al.

(10) Patent No.: US 7,236,322 B2
(45) Date of Patent: Jun. 26, 2007

(54) METHOD, SYSTEM, AND PROGRAM FOR STORING DATA IN A STORAGE MEDIUM

(75) Inventors: Paul Merrill Greco, Tucson, AZ (US); Glen Alan Jaquette, Tucson, AZ (US); James Mitchell Karp, Tucson, AZ (US); Hirokazu Nakayama, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 10/645,754

(22) Filed: Aug. 20, 2003

(65) Prior Publication Data

US 2006/0164744 A1    Jul. 27, 2006

(51) Int. Cl.
*G11B 21/02*    (2006.01)
*G11B 5/09*    (2006.01)
(52) U.S. Cl. ........................................................ 360/75
(58) Field of Classification Search ...................... None
See application file for complete search history.

(56) References Cited

U.S. PATENT DOCUMENTS

| 4,410,942 | A | 10/1983 | Milligan et al. |
| 4,435,762 | A | 3/1984 | Milligan et al. |
| 4,675,807 | A | 6/1987 | Gourneau et al. |
| 5,572,378 | A | 11/1996 | Schwarz et al. |
| 6,295,177 | B1 | 9/2001 | Bickers et al. |
| 6,532,128 | B1 | 3/2003 | Bui et al. |
| 6,856,479 | B2 * | 2/2005 | Jaquette et al. ................ 360/48 |
| 6,865,043 | B2 * | 3/2005 | Ataku et al. .................... 360/48 |
| 6,937,411 | B2 * | 8/2005 | Goodman et al. ............. 360/48 |
| 6,950,257 | B1 * | 9/2005 | Greco et al. ................... 360/48 |
| 6,970,311 | B2 * | 11/2005 | Jaquette ........................ 360/46 |

FOREIGN PATENT DOCUMENTS

| EP | 0324542 A2 | 7/1989 |
| WO | WO 00/23992 | 4/2000 |

(Continued)

OTHER PUBLICATIONS

IBM Corp., "Variable IBM Mode for Tape Drive", Technical Disclosure Bulletin, vol. 25, No. 6, Nov. 1982, p. 2880.

(Continued)

*Primary Examiner*—K. Wong
(74) *Attorney, Agent, or Firm*—David W. Victor; Konrad Raynes & Victor LLP

(57) ABSTRACT

Provided are a method, system, and program for writing data in a tape medium having wraps. A layout of the tape is provided including at least one segment within a full available length of a first set of wraps for writing user data and at least one segment within a full length of a second set of wraps for writing a work copy of the user data. User data is received to write to the tape medium and detecting is performed as to whether the data being written is occurring in a specified write mode. If the data writing is not occurring in the specified write mode, then writing the received user data to one segment in the first set of wraps. If the data writing is occurring in the specified write mode, then writing a work copy to available full length wraps not having user data.

36 Claims, 19 Drawing Sheets

FOREIGN PATENT DOCUMENTS

WO     WO 00/23993     4/2000
WO     WO 0072323 A1     11/2000

OTHER PUBLICATIONS

U.S. Patent Application entitled "Data Set Information for Recovery of Synchronized Data on Magnetic Tape", U.S. Appl. No. 10/293,550, filed Nov. 14, 2002 by inventors T. Ataku, P. Greco, H. Itagaki; G. Jaquette; H. Nagura; and T. Shiratori.

U.S. Patent Application entitled "Method, System, Program, and Storage Cartridge for Storing Data in a Storage Medium", U.S. Appl. No. 09/923,599, filed Aug. 6, 2001 by inventors B.Goodman, G. Jaquette; L Jesionowski; and J. McDowell.

Preliminary Amendment for U.S. Appl. No. 09/923,599, entitled "Method, System, Program, and Storage Cartridge for Storing Data in a Storage Medium", filed Aug. 6, 2001 by inventors B.Goodman, G. Jaquette; L Jesionowski; and J. McDowell.

Reser, "Method for Transferring Large Amounts of Data to Streaming Tapes", IBM Corporation, IBM Technical Disclosure Bulletin, vol. 31, No. 6, Nov. 1988, pp. 341-342.

\* cited by examiner

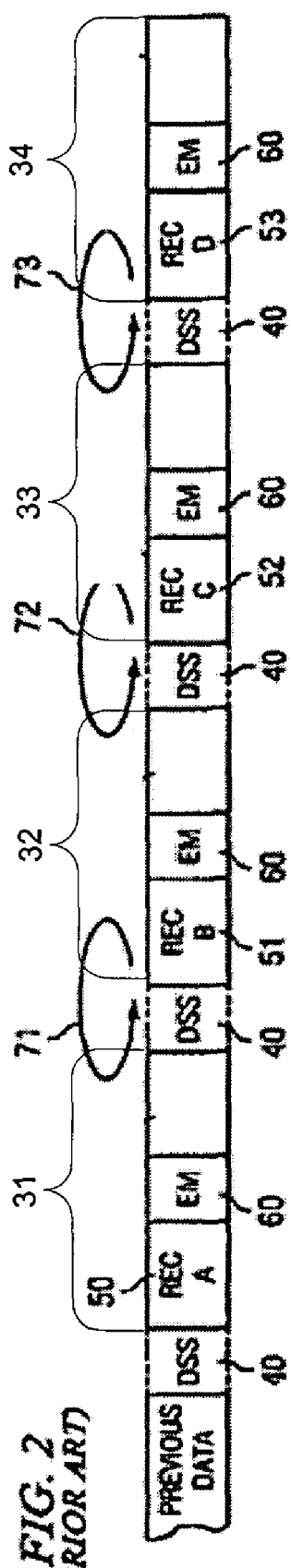
FIG. 2 (PRIOR ART)
FIG. 3

FIG.18

| Wrap Section | Begins | Ends | Direction |
|---|---|---|---|
| 0 | LP3 | LP4' | Forward |
| 1 | LP4' | LP3 | Backward |
| 2 | LP3 | LP4' | Forward |
| 3 | LP4' | LP3 | Backward |
| .... | .... | ..... | ..... |
| 46 | LP3 | LP4' | Forward |
| 47 | LP4' | LP3 | Backward |
| 48 | LP3' | LP4 | Forward |
| 49 | LP4 | LP3' | Backward |
| 50 | LP3' | LP4 | Forward |
| 51 | LP4 | LP3' | Backward |
| 52 | LP3' | LP4 | Forward |
| ... | .... | .... | .... |
| 94 | LP3' | LP4 | Forward |
| 95 | LP4 | LP3' | Backward |

FIG. 19

| Wrap Section | Begins | Ends | Direction |
|---|---|---|---|
| 0 | LP3 | LP4' | Forward |
| 1 | LP4' | LP3 | Backward |
| 2 | LP3 | LP4' | Forward |
| 3 | LP4' | LP3 | Backward |
| .... | .... | ..... | ..... |
| 46 | LP3 | LP4' | Forward |
| 47 | LP3' | LP4 | Forward |
| 48 | LP4 | LP3' | Backward |
| 49 | LP3' | LP4 | Forward |
| 50 | LP4 | LP3' | Backward |
| 51 | LP3' | LP4 | Forward |
| 52 | LP4 | LP3' | Backward |
| ... | .... | .... | .... |
| 94 | LP4 | LP3' | Backward |
| 95 | LP4' | LP3 | Backward |

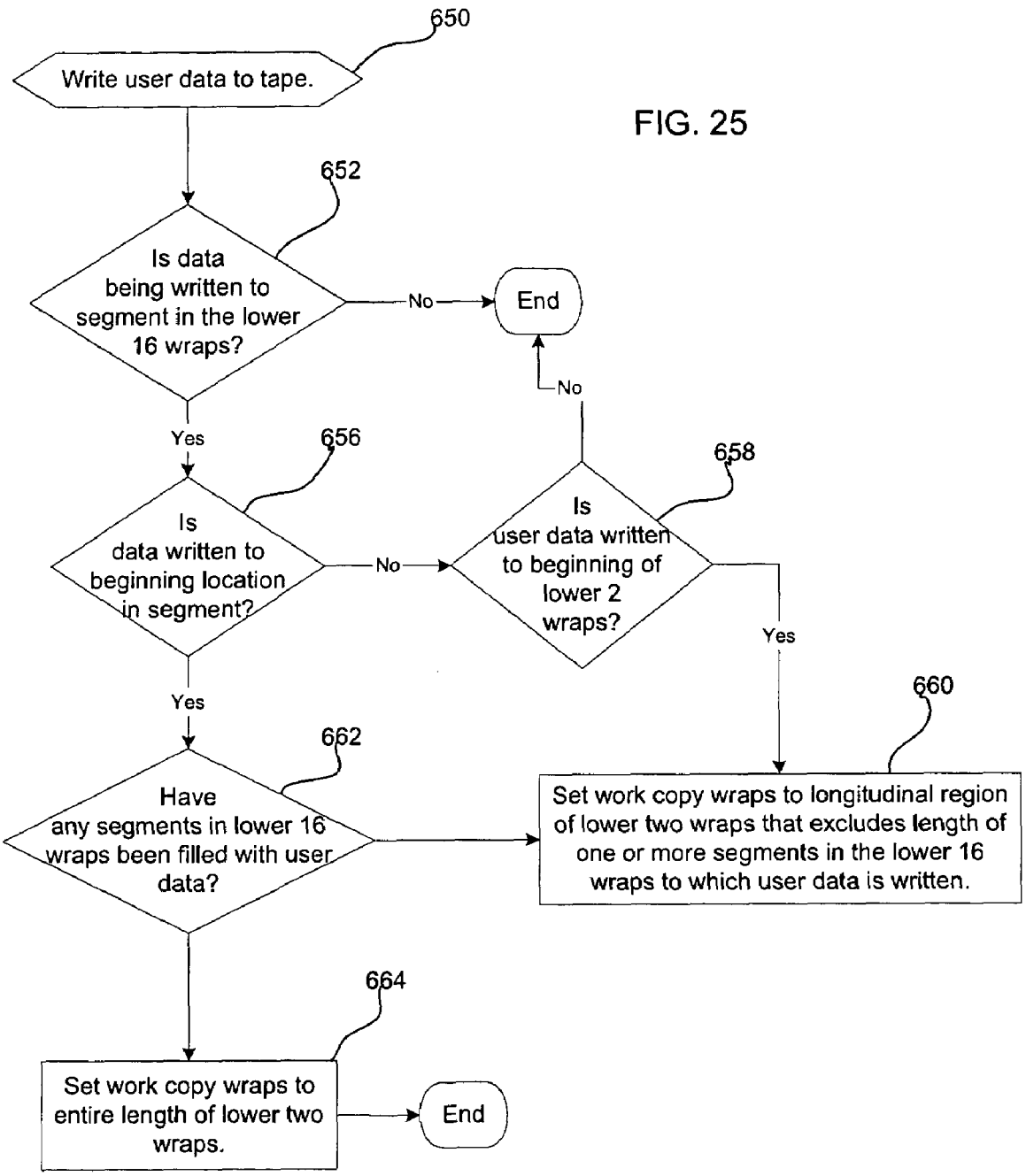

METHOD, SYSTEM, AND PROGRAM FOR STORING DATA IN A STORAGE MEDIUM

BACKGROUND OF THE INVENTION

1. Field of the Invention

The present invention relates to a method, system, and program for storing data in a storage medium.

2. Description of the Related Art

Three prevalent tape storage technologies include a helical scan tape where data is stored along vertical or diagonal tracks on the tape, parallel tape where data is stored on tracks in parallel during one scan on the tape, and serpentine tape where data is written in a forward and then reverse direction in a serpentine pattern across bands or tracks on the magnetic tape medium. In serpentine tape drives, the bands extending the length of the tape may be divided into segments, such as a housekeeping segment, calibration segment, user data segment, etc., where data is written in a serpentine manner within the longitudinal bands of a segment. A serpentine tape drive first read/writes a set of tracks in a forward direction within a segment of a band, referred to as a wrap, then read/writes the next set of tracks in a reverse direction, and so on, leading to a serpentine pattern for the data layout. In serpentine tape technology, a wrap comprises a set of tracks written for some length of one of the bands that extend the entire length of the tape and a wrap section comprises a wrap for the length of one segment.

"Synchronized data" is defined as data or other information which is subject to a "synchronizing event" or similar command requiring the tape drive to not return "Command Complete" to a write type of command, or an indication that the command has been or will be successfully executed, until it has actually committed the data to media, specifically, the magnetic tape. As the result, if power is lost, the data can be recovered from the tape, whereas it may not be recoverable from a volatile DRAM storage of the tape drive buffer.

One example of a synchronizing event is a Write Filemark command with the Immediate bit set to "0". This means that the drive is not to respond immediately, but instead is to respond when the command has completed, meaning that any data sent as part of the command is written out to tape. A specialized case of a Write Filemark command is where the number of Filemarks field is also set to "0", meaning that the Write Filemark command has no data of its own, and all data which precedes the command must be written to tape before a command complete is sent. Hence, this command is often referred to as a "Synchronize" command, as is known to those of skill in the art.

Another example of a synchronizing event is a host selectable write mode known to those of skill in the art as "non-buffered writes", where an implicit synchronize must be performed after each record is written from the host. "Command Complete" is not returned for any write command until the data is successfully written on media.

Herein, writing any data record, group of records, or other mark, is defined as a "transaction", and writing such data record, etc., as the result of a synchronizing event is defined as a "synchronized transaction".

A difficulty with respect to magnetic tape is that the data is recorded sequentially without long gaps between data sets, whereas synchronized transactions are stored in separate bursts for each synchronizing event, with a noticeable time period before writing the next transaction. This requires that the tape drive "backhitch" after writing the synchronized transaction in order to write the next transaction closely following the preceding transaction. Tape is written or read while it is moved longitudinally at a constant speed. Hence, a backhitch requires that the tape be stopped, reversed to beyond the end of the previous transaction, stopped again, and accelerated up to speed in the original direction before the next transaction can be written to the tape. As is understood by those of skill in the art, the backhitch process consumes a considerable amount of time, and, if a large number of small synchronized transactions are to be stored, the throughput of the tape drive is reduced dramatically. As an example, backhitch times can vary from about half a second to over three seconds.

SUMMARY OF THE PREFERRED EMBODIMENTS

Provided are a method, system, and program for writing data in a tape medium having wraps. A layout of the tape is provided including at least one segment within a full available length of a first set of wraps for writing user data and at least one segment within a full length of a second set of wraps for writing a work copy of the user data. User data is received to write to the tape medium and detecting is performed as to whether the data being written is occurring in a specified write mode. If the data writing is not occurring in the specified write mode, then writing the received user data to one segment in the first set of wraps. If the data writing is occurring in the specified write mode, then writing a work copy to available full length wraps not having user data.

In further implementations, the received user data is accumulated in a buffer when writing work copies and all the accumulated user data in the buffer is written to at least one segment in the first set of wraps if the buffer reaches a threshold amount of data or if data is no longer being written in the specified write mode.

In still further implementations, if there are no available segments in the first set of wraps for user data, then writing user data to one segment in the second sets of wraps. Moreover, the work copy wraps may be written to an available full length wraps in the second sets of wraps not having user data.

Yet further, data may be written in a serpentine manner through wraps in the segments within longitudinal boundaries in the wrap defined by the segment, and after writing user data to all wraps in a segment, user data may be written to the wraps in an additional available segment.

BRIEF DESCRIPTION OF THE DRAWINGS

Referring now to the drawings in which like reference numbers represent corresponding parts throughout:

FIG. 2 is a diagrammatic illustration of synchronized data written on a magnetic tape employing the prior art methodology with backhitches;

FIG. 3 is a diagrammatic illustration of synchronized data written on magnetic tape employing one embodiment of the present invention;

FIGS. 18 and 19 explain serpentine patterns for writing data to wrap sections in accordance with implementations of the invention.

FIGS. 23, 24, and 25 illustrate logic to write data to segments in a tape medium in accordance with implementations of the invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Backhitchless Writing

Figure 1:
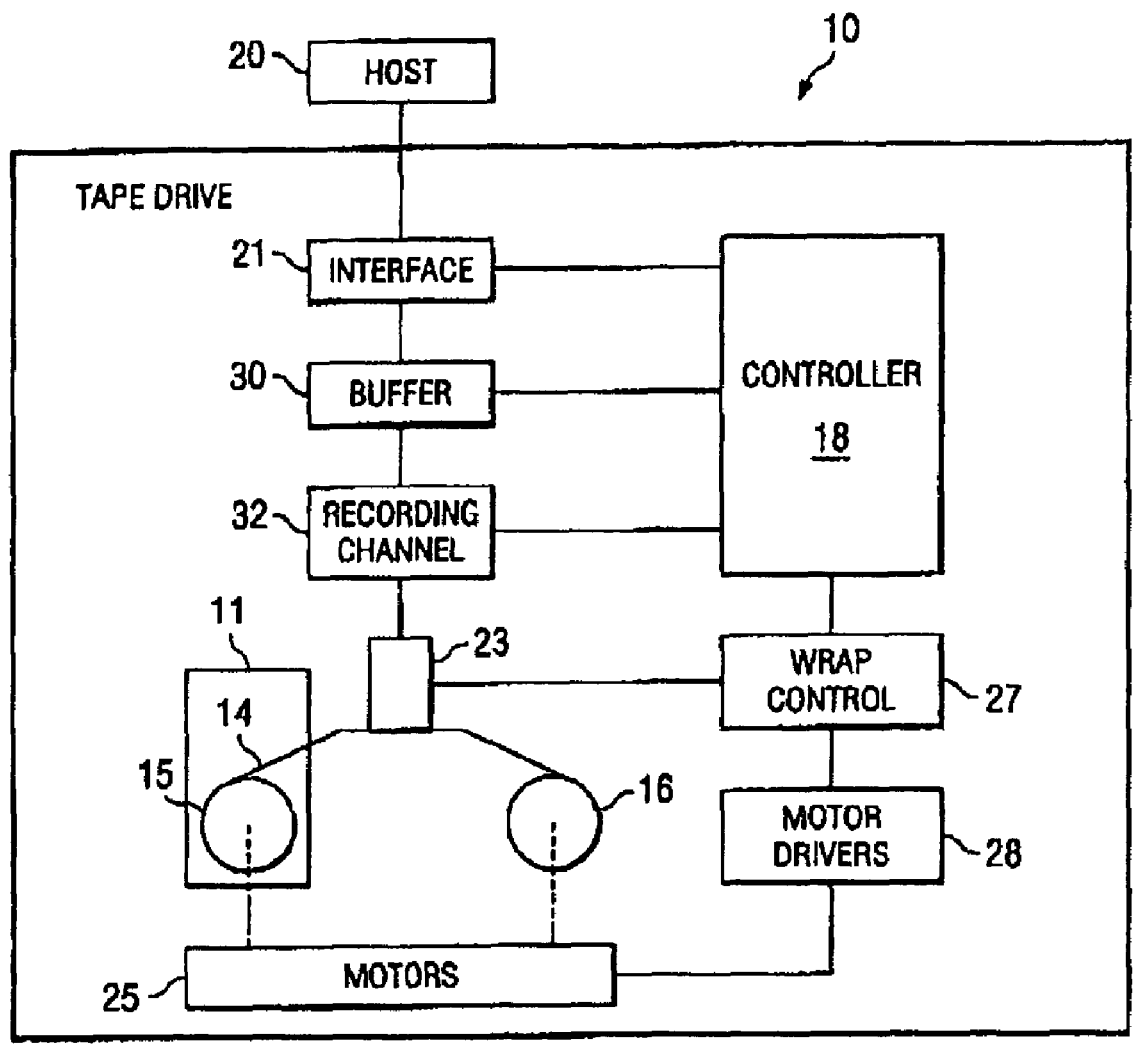
FIG. 1 is a block diagram of a magnetic tape drive with a magnetic tape cartridge which tape drive may implement the present invention.

Referring to FIG. 1, a tape drive 10 is illustrated which may implement aspects of the present invention. The tape drive provides a means for reading and writing information with respect to a magnetic tape cartridge 11. A cartridge and associated tape drive are illustrated, such as those adhering to the Linear Tape Open (LTO) format. An example of a single reel tape drive is the IBM 3580 Ultrium magnetic tape drive based on LTO technology. A further example of a single reel tape drive and cartridge is such as that discussed in U.S. Pat. No. 5,432,652, Comeaux et al., issued Jul. 11, 1995. Another example of a single reel tape drive is the IBM 3590 Magstar magnetic tape drive and associated magnetic tape cartridge. An example of a dual reel cartridge is the IBM 3570 magnetic tape cartridge and associated drive.

As is understood by those of skill in the art, a magnetic tape cartridge 11 comprises a length of magnetic tape 14 wound on one or two reels 15, 16. Also as is understood by those of skill in the art, a tape drive 10 comprises one or more controllers 18 of a recording system for operating the tape drive in accordance with commands received from a host system 20 received at an interface 21. The tape drive may comprise a standalone unit or comprise a part of a tape library or other subsystem. The tape drive 10 may be coupled to the host system 20 directly, through a library, or over a network, and employ the Small Computer Systems Interface (SCSI), Fibre Channel Interface, etc.

The magnetic tape cartridge 11 may be inserted in the tape drive 10, and loaded by the tape drive so that one or more read and/or write heads 23 of the recording system reads and/or writes information with respect to the magnetic tape 14 as the tape is moved longitudinally by one or more motors 25. The magnetic tape comprises a plurality of parallel tracks, or groups of tracks. In some formats, such as the LTO format, discussed above, the tracks are arranged in a serpentine back and forth pattern of separate wraps, as is known to those of skill in the art. Also as known to those of skill in the art, the recording system comprises a wrap control system 27 to electronically switch to another set of read and/or write heads, and/or to seek and move the read and/or write heads 23 laterally relative to the magnetic tape, to position the heads at a desired wrap or wraps, and, in some embodiments, to track follow the desired wrap or wraps. The wrap control system may also control the operation of the motors 25 through motor drivers 28, both in response to instructions by the controller 18.

Controller 18 also provides the data flow and formatting of data to be read from and written to the magnetic tape, employing a buffer 30 and a recording channel 32, as is known to those of skill in the art.

As discussed above, magnetic tape provides a means for physically storing data which may be archived or which may be stored in storage shelves of automated data storage libraries and accessed when required. Tape drives often employ a "read after write" process to insure that the data is written correctly to provide an aspect of permanence. This permanence allows copies of the data stored in memory or disk at the host system 20 to be erased, knowing that a correct copy exists on magnetic tape.

The available storage space at the host system is relatively expensive, and there is a desire to release the storage space as soon as possible. Hence, data is typically transferred through an intermediate staging buffer, such as a hard disk, to the tape drive, and there is also a desire to release and overwrite the staging buffer as soon as possible. In the instant example, the staging buffer, if any, is considered to comprise part of the host system 20.

In order to release the staging buffer, it is necessary to have an assurance that the data has actually been recorded on the magnetic tape 14, and is not just in a volatile DRAM storage, such as buffer 30, and may be lost if power to the buffer or to the drive is lost. Thus, it is often desirable to "synchronize" the data, requiring the tape drive to not return "Command Complete" to a write type of command, or an indication that the command has been or will be successfully executed, until it has actually committed the data to media, specifically, the magnetic tape 14. Once the data has been written to the magnetic tape, if power is lost, the data can be recovered from the tape, whereas it may not be recoverable from a volatile DRAM storage of the tape drive buffer.

Various examples of synchronizing events which have the effect of synchronizing the data are known to those of skill in the art. One example of a synchronizing event is a Write Filemark command with the Immediate bit set to "0". This means that the drive is not to respond immediately, but instead is to respond when the command has completed, meaning that any data sent as part of the command is written out to tape. A specialized case of a Write Filemark command is where the number of Filemarks field is also set to "0", meaning that the Write Filemark command has no data of its own, and the only meaning of the command is that all data which precedes the command must be written to tape before a command complete is sent. Another example is a host selected non-buffered write mode implicitly requiring a synchronize for each record.

Referring to FIG. 2, data is typically recorded on magnetic tape sequentially with only short gaps between data sets, for example between data sets 31 and 32, 32 and 33, etc. These gaps may be written with an Interblock Gap (IBG) pattern, or may comprise a Data Set Separator (DSS) pattern 40, as is known to those of skill in the art. The gap may comprise an actual unrecorded portion and a portion that is recorded. For example, the DSS of the LTO format is comprised of a tone pattern between data sets. As discussed above, the tape is written or read while motors 25 of FIG. 1 move the tape longitudinally. Data typically comprises a string of records arranged in data sets, each with a DSS, which are written with nominal spacing. Only occasionally, typically when the buffer is empty, is the tape stopped.

However, if the data is synchronized, it must be immediately written to tape from the buffer, and only after the synchronized transaction has been written to tape is the transaction freed in the buffer to allow it to be overwritten and because the buffer empties typical tape drive operation is to backhitch so that the next data received to be written is placed immediately following the just written data to avoid wasting storage space in between them, such that it cannot be the subject of a continuous data flow. Hence, synchronized transactions instead must be written immediately in separate bursts for each synchronization event. As the result, after one data set is written for a synchronized transaction, in the prior art of FIG. 2, to insure that the data sets are closely spaced, the controller 18 of FIG. 1 typically operates the servo system and motor drivers to stop the tape after the data set. Some finite distance and finite time is required to stop the tape, and the tape is then "backhitched", reversed to beyond the end of the previous data set, stopped again, and accelerated up to speed in the original direction before the DSS and the next data set may be written to the tape. As is understood by those of skill in the art, the backhitch process consumes a considerable amount of time.

Thus, if a large number of synchronized transactions are to be stored, the throughput of the tape drive is reduced dramatically. As an example, backhitch times can vary from about half a second to over three seconds each.

In the example of FIG. 2, records 50–53 are synchronized. Typically, a transaction will comprise hundreds of records, but only transactions of one record each are illustrated for descriptive purposes herein. If a transaction comprised of a record, or group of records, ends in the middle of a data set, then an End Marker (EM) is written to signal that the remainder of that data set is empty. Typically, each synchronized transaction is formatted as a small number of data sets, and may comprise only one, as is illustrated in FIG. 2 as data records 50–53 in data sets 31–34. Thus, the prior art process requires that the tape drive 10 backhitch (shown by arrow 71) after writing data set 31 (to synchronize transaction record 50), to be positioned to write data set 32 with a minimum amount of DSS pattern in between; to backhitch 72 after writing data set 32 to synchronize transaction record 51, to be positioned to write data set 33; etc. The process continues until all of the synchronized data has been written.

FIGS. 1 and 3 illustrate embodiments of the present invention for reducing the number of backhitches for the synchronized data.

In one embodiment, the recording system for a magnetic tape drive, e.g., magnetic tape drive 10 of FIG. 1, comprises at least one buffer 30 for storing data in the form of data transactions to be written to magnetic tape 14, at least one recording channel 32 coupled to the buffer for operating at least one read/write head 23 for writing transactions from the buffer to the magnetic tape, and at least one controller 18.

In one aspect of the present invention, the controller 18 detects a synchronized received transaction, e.g., transaction record 50 of FIG. 3, stored in the buffer 30; writes the detected synchronized transaction record 50, with EM 60, from the buffer to the magnetic tape as data set 80; continuing the gap with or without separator signals 90 until a subsequently received synchronized transaction 51 (data set 81) is written to the magnetic tape following the separator signals, and this may leave an elongated gap which comprises an unrecorded gap and/or written separator signals 90 (e.g., DSS) to the magnetic tape following the written synchronized transaction record 50 (data set 80); and repeats the detection of a synchronized received transaction (e.g., record 51), writing the detected synchronized transaction (as data set 81), and writing the gap of separator signals (e.g., separator signals 91), etc., for each succeeding detected synchronized received transaction, such that the tape is moved longitudinally during the repeated writing without stopping. Thus, there is no backhitch, the tape drive continues to write the synchronized transactions without stopping.

To complete the example of FIG. 3 for the four illustrated synchronized transaction records 50–53, the next synchronized received transaction 52 is detected, and is written as data set 82, and the gap separator signals (e.g., separator signals 92) are typically written for some or all of the distance until the next detected synchronized received transaction 53 is written as data set 83, etc.

Thus, in this aspect of the present invention, no backhitch is required, saving considerable processing time for completing the process for writing all of the synchronized data.

In another embodiment of the present invention, also illustrated by FIGS. 1 and 3, space on the magnetic tape is saved by recursively writing the synchronized data. To preserve the synchronized transactions 50–53 in the event that power is lost, the data sets 80–83 are considered as work copies of the transactions. Once the transactions have been recursively rewritten, the work copies may be overwritten.

First, the controller 18 detects a pattern of synchronized transactions to be written to the magnetic tape 14. A pattern may comprise a predetermined number of consecutive synchronized transactions of less than a certain length. As one example, a pattern may comprise two consecutive synchronized transactions, each having a length less than that of a data set or some other threshold. As discussed above, the typical synchronized transaction is written to tape, and then the transaction is erased from the host system with the assurance that the transaction has been written and will not be lost even as the result of a power loss. Additionally, the data will not be lost even in the event of a subsequent permanent write error preventing recursive write.

In accordance with the present invention, the controller 18 writes each detected synchronized transaction, illustrated as a record 50–53, of the detected pattern from the buffer to the magnetic tape 14, e.g., as data sets 80–83, above. Previous synchronized transactions of the detected pattern may be excluded, having already been written in the manner discussed above before the pattern is detected. Thus, in FIG. 3, the previous synchronized transactions may comprise the previous data 99. Upon writing each synchronized transaction of the detected pattern from the buffer to the magnetic tape, the controller accumulates the synchronized transaction in the buffer 30; and subsequently recursively writes the accumulated transactions from the buffer to the magnetic tape in a sequence, e.g., illustrated as data sets 100, 101. The recursive writing may comprise a backhitch to place the recursively written accumulated transactions following the preceding data 99 with the nominal gap. Thus, the synchronized transactions 50–53 have been immediately written to the magnetic tape 14, and preserved against a power loss at the buffer 30, as work copies in data sets 80–83, while also being accumulated in buffer 30, and then recursively written to immediately follow the preceding data 99 in data sets 100,101, saving space. Once the transactions have been recursively written, the work copies 80–83 may be overwritten.

The point at which the accumulated synchronized data is recursively written may comprise the termination of the pattern of synchronously written transactions, may comprise a predetermined threshold, such as the limit of capacity of the buffer 30 to accumulate data records, or may comprise the limit of capacity on tape for the work space which holds work copies 80–83 and their separation signals 90–92.

In the embodiment of FIG. 3, the controller separately writes each synchronized transaction 50–53 from the buffer to the magnetic tape, in the example as data sets 80–83, and identifies each separately written synchronized transaction, for example, by means of an access point 110–113. Access points are a means under the LTO format for designating the beginning of a valid current data record or records, and are typically at the beginning of a data set.

The controller additionally identifies the recursively written transactions as the most current copy thereof, employing a new access point 115, superseding the identified separately written synchronized transactions of the data sets 80–83. Alternatively, or additionally, the write pass indication "WP" for each data set may be incremented to indicate that the recursively written transactions are each the most recent copy, superseding the identified separately written synchronized transactions of the data sets 80–83. Both access points and write pass procedures are within the LTO format, as is known to those of skill in the art. The modification of the access points in accordance with the present invention is discussed hereinafter. As the result, should power be lost before the work copies 80–83 are overwritten, examination of the access points and/or write pass indicators will allow a correct recovery of data contained therein to be made.

Figure 4:
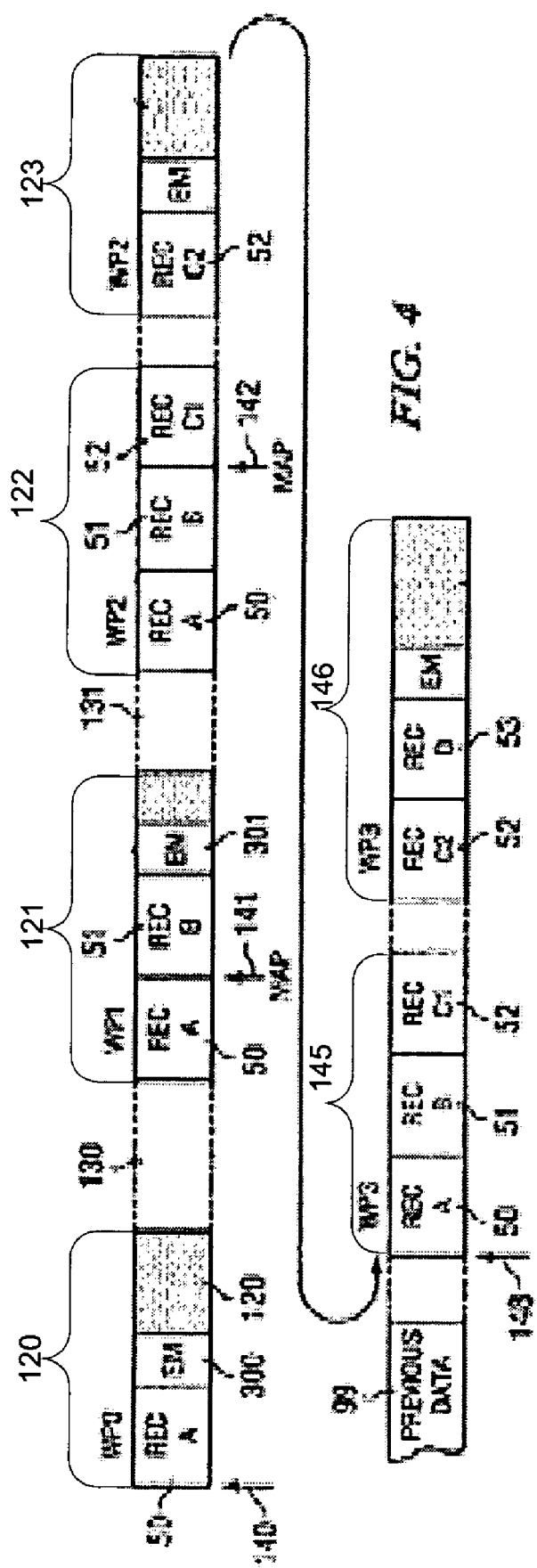
FIG. 4 is a diagrammatic illustration of synchronized data written on magnetic tape employing an alternative embodiment of the present invention.

An alternative embodiment of the present invention is illustrated in FIG. 4, wherein the controller writes each synchronized transaction 50–53 of the detected pattern of synchronizing events from the buffer to the magnetic tape by writing data sets of transactions, and, for any partial data set that was not filled upon writing a transaction, rewriting the partial data set and appending the next synchronized transaction that is being written. The partial data set is obtained from the data accumulated in the buffer 30 of FIG. 1. Thus, a transaction of one or more records, shown as record 50, is written separately in data set 120, followed by an End Marker 300 as comprising a partial data set. Then, the DSS 130 is written, and the transaction is accumulated in buffer 30. The subsequent transaction 51 is appended to the accumulated transaction 50 in data set 121 which is written, causing transaction 50 (or the last part of transaction 50 if it includes previous data sets) to be rewritten and the appended transaction 51 to be written to tape, so that there is a concentration of the transactions. As data set 121 is also a partial data set, End Marker 301 is written, and the data set 121 is followed by DSS 131, and transaction 51 is accumulated in the buffer. The process continues as the subsequent transaction 52 is appended to the accumulated transactions 50 and 51 of the partial data set, and the rewritten accumulated transactions 50, 51 and the synchronized transaction 52 are written as data sets 122 and 123, etc. Once a data set has been filled, it is again rewritten, such as data set 122, and, after that filled data set is written once, it does not need to be written again on the work wraps.

In accordance with the present invention, a moving access point identifies a synchronized transaction appended to a rewritten synchronized transaction, thereby allowing skipping the rewritten synchronized transaction in a read recovery process, as will be discussed.

The rewritten and appended written synchronized transaction is identified as the most current copy thereof, for example by means of an incremented write pass "WP" for the data set, as discussed above.

Subsequently, upon recursively writing the data sets, the controller additionally identifies the recursively written transactions as the most current copies thereof, for example by further incrementing the write pass "WP" for the data sets, superseding the written and/or identified rewritten and appended written synchronized transactions.

For example, the write pass indicator of data set 121 for transaction 50, when rewritten for the first time, is incremented to "WP1", and the write pass indicator for data set 122 in which transaction 50 is rewritten a second time, is incremented to "WP2". The controller then recursively writes the transactions 50–53 as data sets 145 and 146. The controller additionally identifies the recursively written transactions as the most current copy thereof, incrementing the write pass for the data set 145 containing transaction 50 an additional time to "WP3". Again, as the result, should power be lost before the work copies 120–123 are overwritten, examination of the write pass indicators will allow a correct recovery to be made.

Alternatively, FIG. 4 represents a further alternative embodiment of separately writing each of the synchronized transactions discussed above, in that the write pass indicator need not be updated. Instead, the active copy of the transaction is indicated by an access point 140–142. In accordance with the present invention, access points 141 and 142 are moving access points which identify a synchronized transaction appended to a rewritten synchronized transaction, thereby allowing skipping the rewritten synchronized transaction in a read recovery process, as will be discussed. Thus, transaction 50 is indicated by access point 140, transaction 51 is indicated by a moving access point 141, etc. The controller recursively writes the transactions 50–53 as data sets 145 and 146, and additionally identifies the recursively written transactions as the most current copy thereof, employing an access point 148, superseding by means of Write Pass number and location (on the standard wraps) the identified separately written synchronized transactions of the data sets 120–123.

Figure 5:
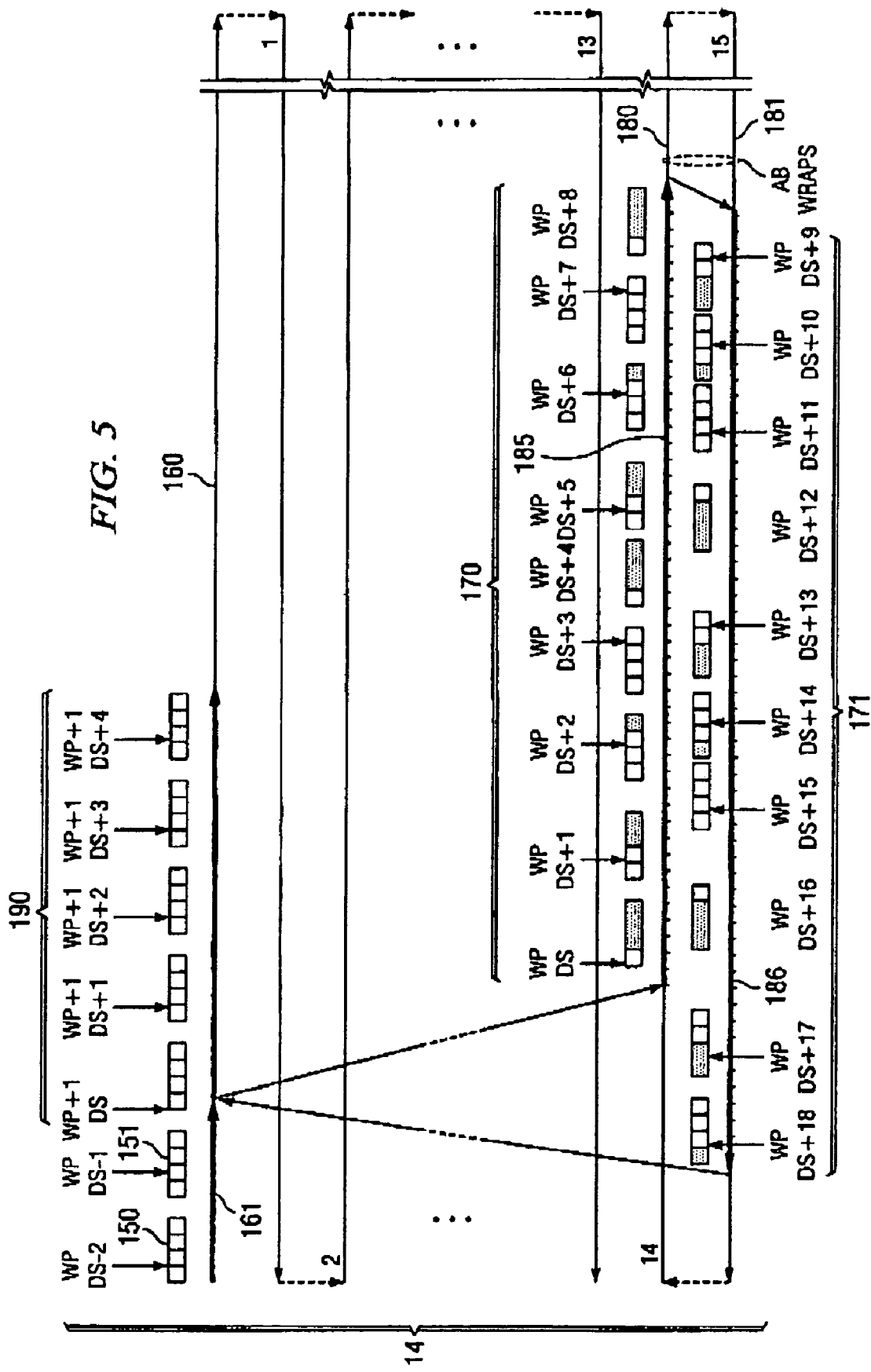
FIG. 5 is a diagrammatic illustration of synchronized data written on magnetic tape having a plurality of wraps, and employing separate accumulating backhitchless wraps for storing a work copy in accordance with an embodiment of the present invention.

Referring to FIG. 5, in still another embodiment, where the magnetic tape comprises a plurality of wraps, such as in an LTO system as discussed above, the controller 18 of FIG. 1 writes the work copies of at least some of the synchronized transactions of the detected pattern on at least one of the plurality of wraps that is separate from the wrap to which it will be recursively written. Thus, a good working copy is fixed on the tape before the final set of transactions in the example are recursively written.

Specifically, in the example, the pattern of synchronously written transactions is detected after data sets 150 and 151 have been written on standard wrap 160 in the direction of arrow 161. The controller operates the wrap control system 27 of FIG. 1 to electronically switch read/write heads, or to conduct a seek and reposition the tape head 23 to a set of work copy wraps, such as accumulating backhitchless wraps 180 and 181.

In one embodiment, the controller 18 designates a plurality of wraps of the magnetic tape 14 as work copy wraps 180, 181, and, upon detecting a pattern of synchronizing events, determines whether access to the work copy wraps requires a seek, or may be conducted electronically, switching to a different set of read/write heads. The controller determines the present longitudinal position of the read write head along the tape, and determines the writable space of work copy wraps in each longitudinal direction from that present longitudinal position. The controller then selects the direction having the greatest writable space. Once the desired direction is known, the controller seeks to a work copy wrap which allows writing in that direction. If a seek is required in which the read write head is moved laterally relative to the tape to access other wraps, the controller 18 may select a work copy wrap in the proper direction enabling the quickest seek. As an example the quickest seek may be to the closest available work copy wrap which can be written in the selected direction. The controller then operates the motors 25, the wrap control 27, and the read/write head to begin writing the synchronized transactions on the selected work copy wrap.

In the example, the work copies 170–171 are then written on the accumulating backhitchless wraps 180 and 181, first in the direction of arrow 185, and then in the direction of arrow 186. In the example, the work copies are written in the manner of separately writing the synchronized transactions by appending, and employing the access points, while ignoring the rewritten data records, all as illustrated in FIG. 4. The reversal of direction between that of arrow 185 to that of arrow 186 provides a reduced distance for the backhitch process, and, accomplishes one reversal of the backhitch. The reversal point for switching direction of writing the work copies from the direction of arrow 185 to that of arrow 186 may comprise the point at which the buffer 30 of FIG. 1 is about half full of accumulated synchronized transactions. Various algorithms may be employed to determine the reversal point for switching the direction of writing the work copies. The goal of any such algorithm is to reach the original append point (to recursively write the transactions) when the buffer is nearly full of accumulated synchronized transactions.

The controller operates the wrap control system 27 of FIG. 1 to access the tape head 23 to the standard wrap and the synchronized transactions are then recursively written from the buffer to the standard wrap 160 immediately after the preceding data set 151 in the direction of arrow 161, shown as data sets 190. When they have been successfully recursively written, the work copies 170–171 may then be overwritten.

Embodiments of the method of the present invention are illustrated in FIGS. 6–11.

Referring to FIGS. 1, 3, 4 and 6, in step 200, data is received at interface 21 and, in step 201, is stored in buffer 30. Step 203 detects whether the data is accompanied by or followed by a synchronizing event, such that the transaction is to be synchronized. If not, the data is written to the magnetic tape 14 employing a normal algorithm in step 205, for example, writing the data at a time selected by the tape drive, typically to maximize streaming, which may entail delaying the start of writing, in sequence, each data set separated from the previous data set by a DSS.

Upon detection of a synchronizing event at step 203, step 204 kicks off a check at connector 206 to detect a pattern of synchronizing events as will be discussed, and proceeds at step 207. In step 207, the synchronized transaction is written to tape, either as part of the pattern as will be discussed, or as a single transaction. Step 208 determines whether the end of data for the transaction has been reached and, if not, cycles back to step 207 to continue writing the data. Once the end of data for the transaction is sensed and the data has been written to tape in steps 207 and 208, in step 210 the controller 18 signals command complete. Thus, the host system 20 may release the staging buffer or other source of the data. As an example, in FIG. 3, the detected synchronized data record or records 50, with EM 60, is written from the buffer to the magnetic tape as data set 80, and in FIG. 4 as data set 120.

In step 211, the controller 18 leaves a gap and/or writes separator signals (e.g., DSS) to the magnetic tape following the written synchronized data record 50 (in FIG. 3 separator signals 90 following data set 80, in FIG. 4 separator signals 130 following data set 120), continuing the gap and/or separator signals 90, 130 until, as determined by step 212 and steps 203 and 205 or 207 cause a subsequently received transaction 51 (data set 81 in FIG. 3, data set 121 in FIG. 4) to be written to the magnetic tape following the separator signals. The process of FIG. 6 thus repeats the detection of synchronized received transactions (e.g., illustrated as record 51), writing the detected synchronized transactions (as data set 81, 121), and writing the gaps and/or separator signals (e.g., separator signals 91, 131), etc., for each succeeding detected synchronized received transaction, such that the tape is moved longitudinally during the repeated writing without stopping. Thus, there is no backhitch, and the tape drive continues to write the transactions without stopping except to reverse directions in the accumulating backhitchless flush wraps, if necessary, along with a seek to a second accumulating backhitchless flush wrap.

Figure 7:
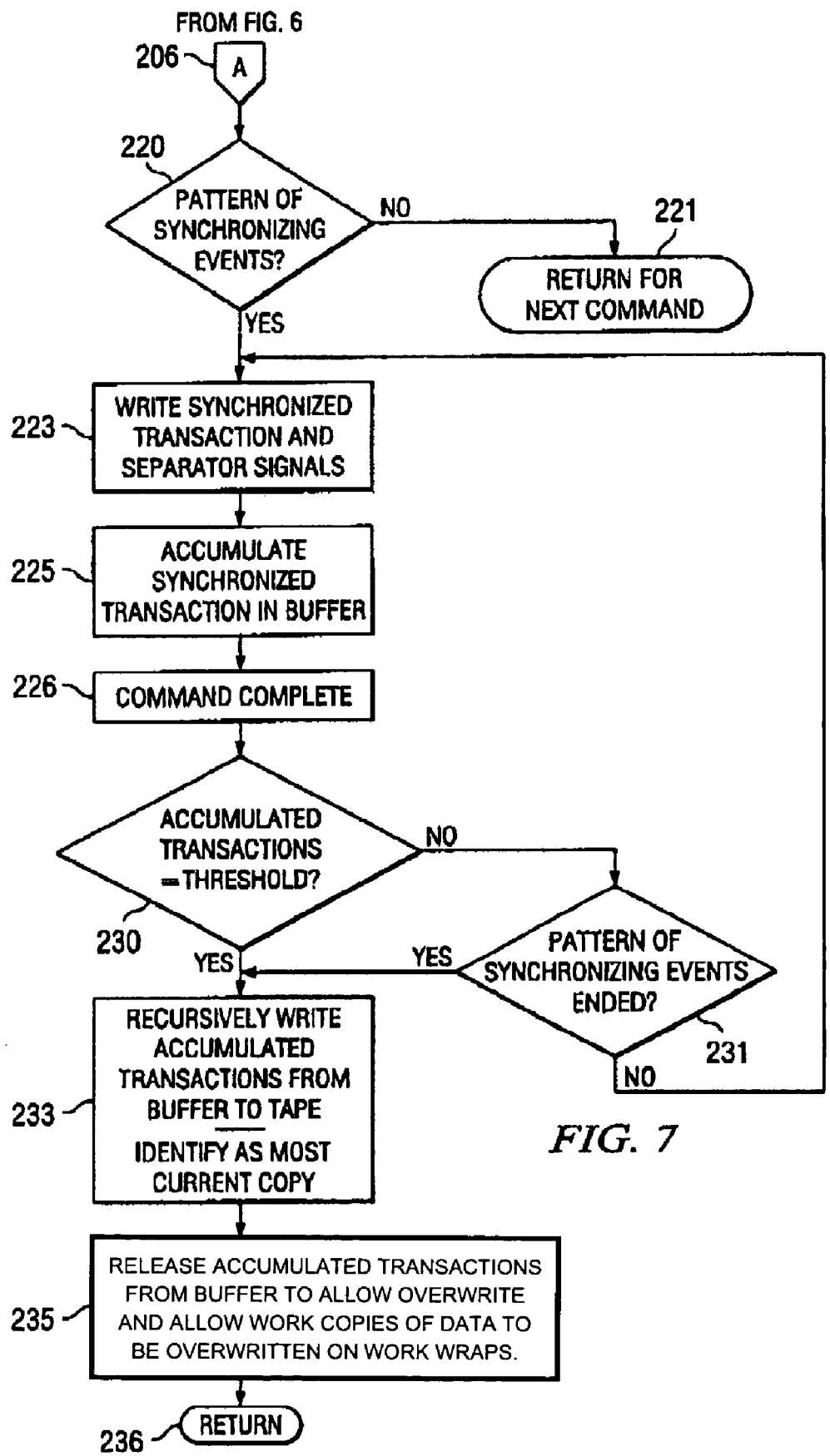
FIG. 7 is a flow chart depicting an embodiment of the method of the present invention for accumulating synchronized data for recursively writing the data.

Connector 206 leads to FIG. 7. Referring to FIGS. 1, 3, 4 and 7, space on the magnetic tape is saved by recursively writing the synchronized data. To preserve the transactions 50–53 in the event that power is lost, the data sets 80–83 are considered as work copies of the transactions. Once the transactions have been recursively written, the work copies are released and then be overwritten.

First, in step 220, the controller 18 detects a pattern of synchronizing events for transactions to be written to the magnetic tape 14. As discussed above, a pattern may comprise a predetermined number of consecutive synchronizing events for transactions of less than a certain length. The pattern may not appear as a sequence of synchronize commands or explicit write mode, but may appear implicitly as a sequence of emptied buffer events. If there is no such pattern, the controller, in step 221, returns for the next command (at block 200 of FIG. 6).

Figure 6:
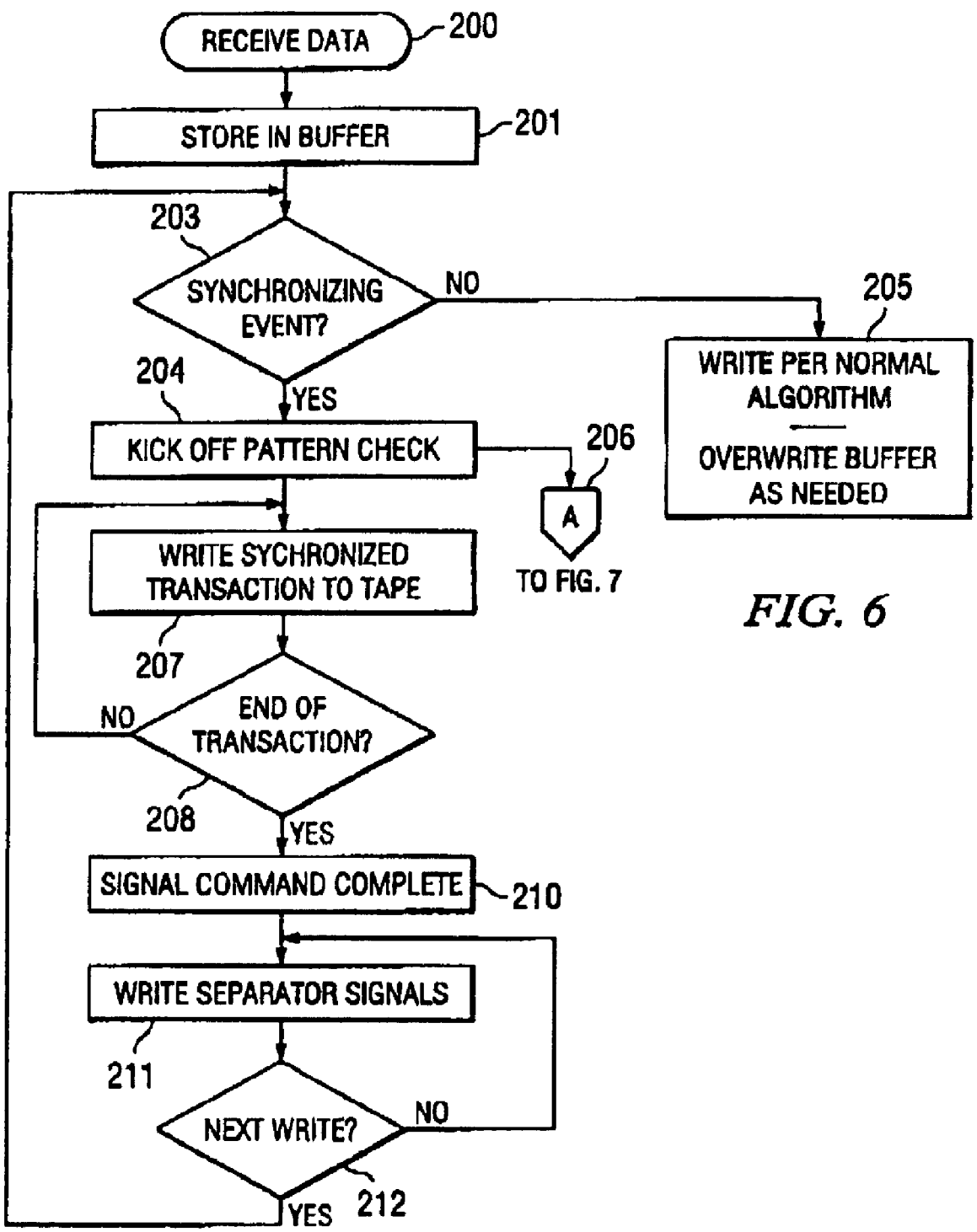
FIG. 6 is a flow chart depicting an embodiment of the method of the present invention for backhitchless writing of synchronized data.

In accordance with the present invention, upon detecting a pattern of synchronizing events in step 220, the controller 18, in step 223, separately and completely writes each detected synchronized transaction 50–53 of the detected pattern from the buffer to the magnetic tape 14, in the manner of the process of FIG. 6, with the gaps and/or separator signals following the data sets. As discussed above, the early synchronized transactions of the detected pattern may be excluded, having already been written in the manner discussed above before the pattern is detected, or before switching to the work copy wraps. Thus, in FIG. 3, and in FIG. 4, the early synchronized transactions may comprise the previous data 99.

In step 225, upon writing each synchronized transaction from the buffer to the magnetic tape, the controller accumulates the synchronized transaction in the buffer 30, providing a command complete in step 226.

Step 230 determines whether the accumulated transactions have reached a predetermined threshold. As discussed above, examples of predetermined threshold may comprise the limit of capacity of the buffer 30 to accumulate transactions, or may comprise the limit of capacity of the work space for the work copies 80–83 and their separation signals 90–92. If the threshold has not been reached, step 231 determines whether the pattern of synchronizing events has ended. If the pattern is continuing, the process cycles back to step 223 to write the next synchronized transaction. Upon either the accumulated transaction threshold being reached in step 230, or upon reaching the end of the pattern of synchronizing events in step 231, in step 233, the controller recursively writes the accumulated transactions from the buffer to the magnetic tape in a sequence, e.g., illustrated as data sets 100, 101 in FIG. 3 or as data sets 145 and 146 of FIG. 4, and identifies the recursively written copies as the most current, e.g., employing the access point 115 of FIG. 3, the write pass indicators of FIG. 4, or the access point 148 of FIG. 4. The recursive writing may comprise a backhitch to place the recursively written accumulated transactions following the preceding data 99.

Since the data has been recursively written to tape, the work copies are no longer required, and the copies in the buffer are no longer required. Hence, in step 235, the accumulated transactions are released to allow this section of the buffer to be overwritten, as is known to those of skill in the art. In step 236, the controller returns to other processing, such as step 200 of FIG. 6.

As discussed above, the purpose of "synchronizing" data is, in order to release the staging buffer, to have an assurance that the data has actually been recorded on the magnetic tape 14, and is not just in a volatile DRAM storage, such as buffer 30, and thereby insure that the data will not be lost if power to the buffer or to the drive is lost. If the data is "synchronized", the tape drive is required to not return "Command Complete" to a write type of command, or an indication that the command has been or will be successfully executed, until it has actually committed the data to media, specifically, the magnetic tape 14. Once the data has been written to the magnetic tape, if power is lost, the data can be recovered from the tape, whereas it may not be recoverable from a volatile DRAM storage of the tape drive buffer. Additionally, the data will not be lost even in the event of a subsequent permanent write error preventing recursive rewrite.

Since the data has been recursively written to tape, the work copies are no longer required, and the copies in the buffer are no longer required. Hence, in step 235, the accumulated transactions are released to allow this section of the buffer to be overwritten, as is known to those of skill in the art. In step 236, the controller returns to other processing, such as step 200 of FIG. 6.

As discussed above, the purpose of "synchronizing" data is, in order to release the staging buffer, to have an assurance that the data has actually been recorded on the magnetic tape 14, and is not just in a volatile DRAM storage, such as buffer 30, and thereby insure that the data will not be lost if power to the buffer or to the drive is lost. If the data is "synchronized", the tape drive is required to not return "Command Complete" to a write type of command, or an indication that the command has been or will be successfully executed, until it has actually committed the data to media, specifically, the magnetic tape 14. Once the data has been written to the magnetic tape, if power is lost, the data can be recovered from the tape, whereas it may not be recoverable from a volatile DRAM storage of the tape drive buffer. Additionally, the data will not be lost even in the event of a subsequent permanent write error preventing recursive rewrite.

In accordance with the present invention, information is provided in a data set information table of each synchronized transaction data set that allows efficient read recovery of the data.

Figure 12:
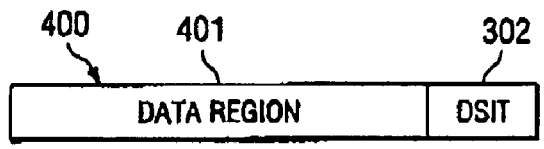
FIG. 12 is a diagrammatic illustration of a data set for synchronized data.

Referring to FIG. 12, an embodiment of a data set 400 for synchronized transaction data is illustrated. Data sets may, but not necessarily, comprise a uniform length to simplify data handling. The largest portion of a data set comprises a data region 401. As discussed above, the data region is typically filled with data, but, in some instances, the active data is terminated with an "End Mark". In nearly every instance, the data of the data region 401 has been processed by a compression algorithm which may have multiple schemes and allow incompressible data to be passed through with minimal expansion. In order to transfer the data to the host, the compressed data is read from the magnetic tape, and must subsequently be decompressed.

In the illustrated embodiment, the data set 400 is terminated with an uncompressed data set information table 302. Data set information tables are typically employed to describe the content of the data region. In accordance with the present invention, special fields are provided in the data set information tables for data sets of synchronized transactions for read recovery. In one example, upon a synchronized transaction partially filling a data set, and the partially filled data set rewritten in a succeeding data set with an appended synchronized transaction, a moving access point in the table of the succeeding data set identifies the appended synchronized transaction, thereby skipping the rewritten transaction. In another example, each data set information table provides a thread for the synchronized transactions, provides the status of the data set within the sequence of the synchronized transaction process, and identifies the wrap of the immediately succeeding data set of the synchronized transactions, to provide a recovery trail. In still another example, the data set information table of a recursively written synchronized transaction provides a backwards pointer to a longitudinal position on the magnetic tape of a written work copy data set. To aid in the recovery process, in data sets of uniform size, the data set information table may also be of a uniform size, and may be at a known location in the data set, e.g., at the end. Thus, in recovery, the controller conducting the recovery knows specifically where to find each data set information table.

Figure 13:
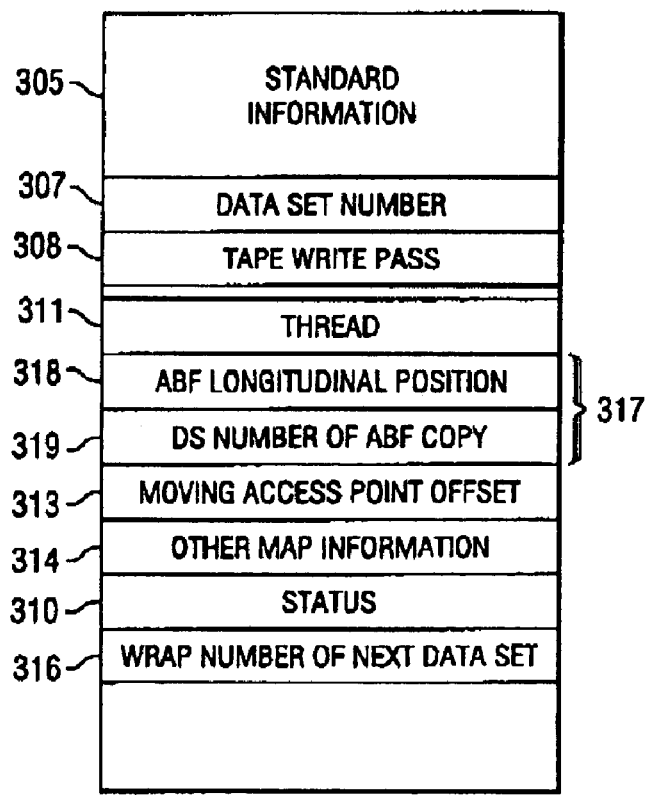
FIG. 13 is a diagrammatic illustration of an embodiment of a data set information table in accordance with the present invention.

An embodiment of a data set information table 302 in accordance with the present invention is illustrated in FIG. 13.

Much of the information in the data set information table is standard information 305. For example, each data set has a Data Set Number 307, which, in one example, is the ordinal number of the data set from the beginning of tape. Other standard information is the Tape Write Pass 308, which is employed as discussed above for synchronized transactions in accordance with the present invention, as the write pass indication "WP" for each data set that may be incremented to indicate that the recursively written transactions are each the most recent copy, superseding the identified separately written synchronized transactions.

In FIG. 13, field 310 of the data set information table, in a portion of the field, identifies the data set as having a synchronized transaction of a detected pattern. If the data set information table were provided in all data sets of the tape, these bits, and much of the remainder of the non-standard fields, may be set to all zero, or "0", in the data sets not having synchronized transactions of a detected pattern.

Field 311 provides a thread for the entire string of data sets of the synchronized transactions of a detected pattern, including work copy synchronized transaction data sets and recursively written synchronized transaction data sets. As one example, the thread for the synchronized transactions of the detected pattern, comprises the write pass number 308 of the last data set having a transaction of the pattern written to the magnetic tape as a normal wrap data set, and before the work copy synchronized transaction data sets are written.

Fields 313 and 314 provide the moving access point for synchronized transaction data sets. Specifically, in the event one of the written synchronized transactions, or the end of a transaction, such as record 50 of FIG. 4, partially fills a data set, such as data set 120, as discussed above, the controller rewrites the partially filled data set in a succeeding data set, such as data set 121. The controller appends a subsequent synchronized transaction, such as record 51 to the rewritten synchronized transaction 50 in the succeeding data set 121 as an appended synchronized transaction.

Referring to FIG. 13, the controller establishes a moving access point for the succeeding data set 121 of FIG. 4 in field 313 of the data set information table 302 of the succeeding data set. The moving access point is an offset, for example, from the beginning of the data set, that identifies the appended synchronized transaction, the new data, and is shown as moving access point 141 in FIG. 4. Thus, in a read recovery process, the process would read record 50 at the access point 140 of data set 120, and would skip the rewritten synchronized transaction 50 in data set 121.

Referring to FIG. 4, in the instance where the transactions comprise compressed information, in a read recovery of the partially filled data set and the succeeding data set, the written synchronized transaction 50 is read and decompressed from the partially filled data set 120, the rewritten synchronized transaction of the succeeding data set is skipped due to the moving access point 141, and the appended synchronized transaction 51 is read and decompressed from the succeeding data set 121. This saves having to read and decompress transactions twice during the recovery process.

Similarly, referring to FIG. 13, the moving access point in field 313 of the data set information table 302 of data set 122 of FIG. 4 comprises an offset shown as moving access point 142.

Specifically, referring to FIG. 4, data set 121, is also partially filled by transactions 50 and 51. Thus, the controller rewrites the synchronized transactions of data set 121 in the succeeding data set 122. The controller appends a subsequent synchronized transaction, such as transaction 52 to the rewritten synchronized transactions 50 and 51 in the succeeding data set 122 as an appended synchronized transaction.

In a read recovery of the partially filled data set and the succeeding data set, the written synchronized transaction 50 is read and decompressed from the partially filled data set 120, transaction 51 is read and decompressed from data set 121 by beginning decompression at the moving access point 141 to skip over rewritten transaction 50, the rewritten synchronized transactions 50 and 51 of the succeeding data set 122 are skipped due to the moving access point 142, and the appended synchronized transaction 52 is read and decompressed from the succeeding data sets 122 and 123. This saves having to read and decompress transactions twice or more during the recovery process.

Field 314 of FIG. 13 represents additional information for the moving access point of field 313, and may comprise the total number of records at the moving access point, the number of file marks, the record count from the moving access point to the end of the transaction or data set, and the file mark count to the end of the transaction or data set.

Field 310 represents the status of the data set. A portion of the field indicates that the data set is a synchronized transaction. The remainder of the field indicates the status of the data set in the sequence of the process for writing the synchronized transactions in a sequence of data sets. In one embodiment of the present invention, certain data sets which represent the last data set before a transition is made to the next sequence of the process are defined in the status field 310.

As discussed above, a data set may be a last data set on the normal wrap before switching to the work copy wraps, may be the last work copy data set on a work copy wrap headed in a first longitudinal direction, may be the last work copy on a second work copy wrap that is headed in the opposite longitudinal direction, or may be the last recursively rewritten data set, such that the process has been completed. Each of these data sets are identified by a specific code in the status field 310 of the data set information table 302.

Thus, a read recovery process easily tracks the progress of the original synchronized transaction process.

Field 316 provides a forward pointer to the wrap of the immediately succeeding data set of the synchronized transactions, if any. Thus, if, as is likely, the immediately succeeding data set is on the same wrap, the read recovery process continues reading in the same direction of the same wrap until the next data set is encountered.

As discussed above, the controller writes the synchronized transactions to work copy wraps of the magnetic tape, likely in the form of spaced apart data sets. Data set information tables are additionally provided for data sets of subsequently recursively written synchronized transactions, which are copies of the synchronized transactions written to the magnetic tape in a sequence of data sets. The controller provides, in the data set information table of each data set, the same information as above, and additionally provides a backwards pointer 317 to a longitudinal position on the magnetic tape of a written work copy data set. As an example, the pointer is provided in fields 318 and 319 to the work copy data set of the next synchronized transaction data set to be recursively written. The data set number 307 of the referenced work copy data set is provided in field 319, and the longitudinal position on the magnetic tape of the referenced data set is provided in field 318. If the same fields are provided in other data set information tables, e.g., for the work copy data sets, they are set to all zero, or "0", in those data sets.

Thus, the thread, the status, and the forward and backwards pointers comprise trails provided by the data set information table 302 for aiding in a read recovery process.

Figure 14:
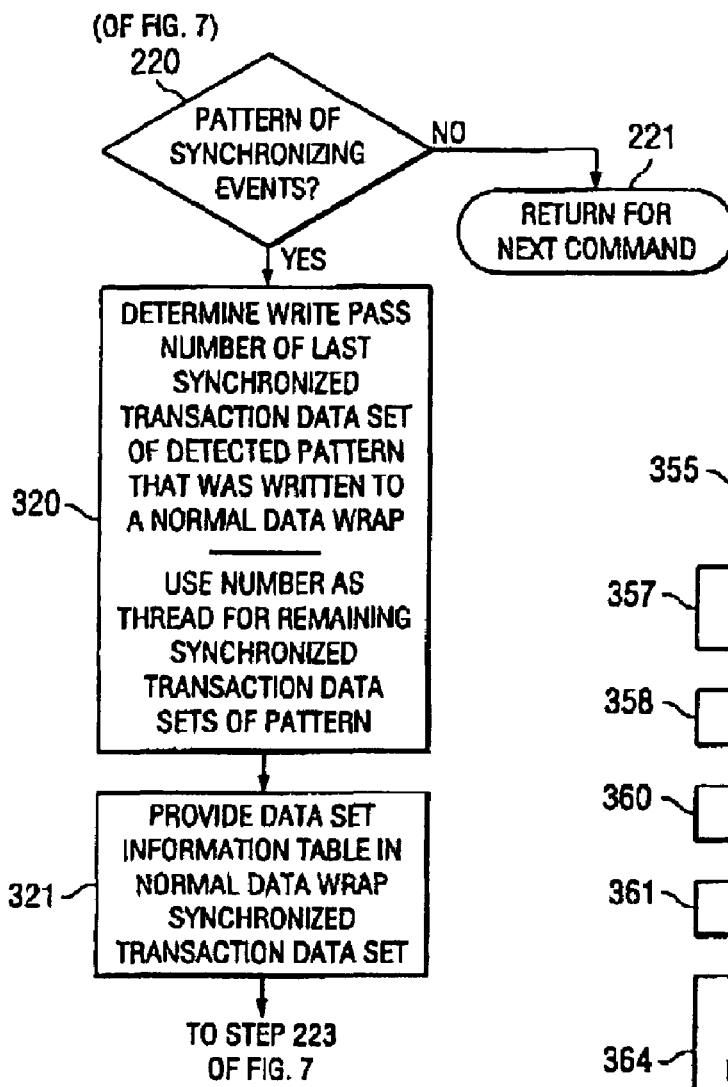
FIG. 14 is a flow chart of an embodiment of additional steps in the flow chart of FIG. 7 to provide information for a data set information table of FIG. 13.

FIG. 14 comprises an embodiment of an addition to the process of FIG. 7 for the purpose of obtaining the thread number for the synchronized data sets, and for providing the data set information table for the last synchronized transaction data set of the detected pattern on the normal wrap before switching to the work copy wraps.

In the illustrated embodiment, after detecting the pattern of synchronizing events of step 220 of FIG. 7, in step 320 of FIG. 14, the controller determines the number representing a thread for the synchronized transactions of the detected pattern. In the example the thread comprises the write pass number of the last data set having a transaction of the pattern written to the magnetic tape as a normal wrap data set, and before the work copy synchronized transaction data sets are written. In FIG. 5, data set 151 is the last normal wrap data set. In step 321 of FIG. 14, the controller provides the data set information table 302 of FIG. 13 for data set 151 of FIG. 5. The process then continues at step 223 of FIG. 7.

Figure 8:
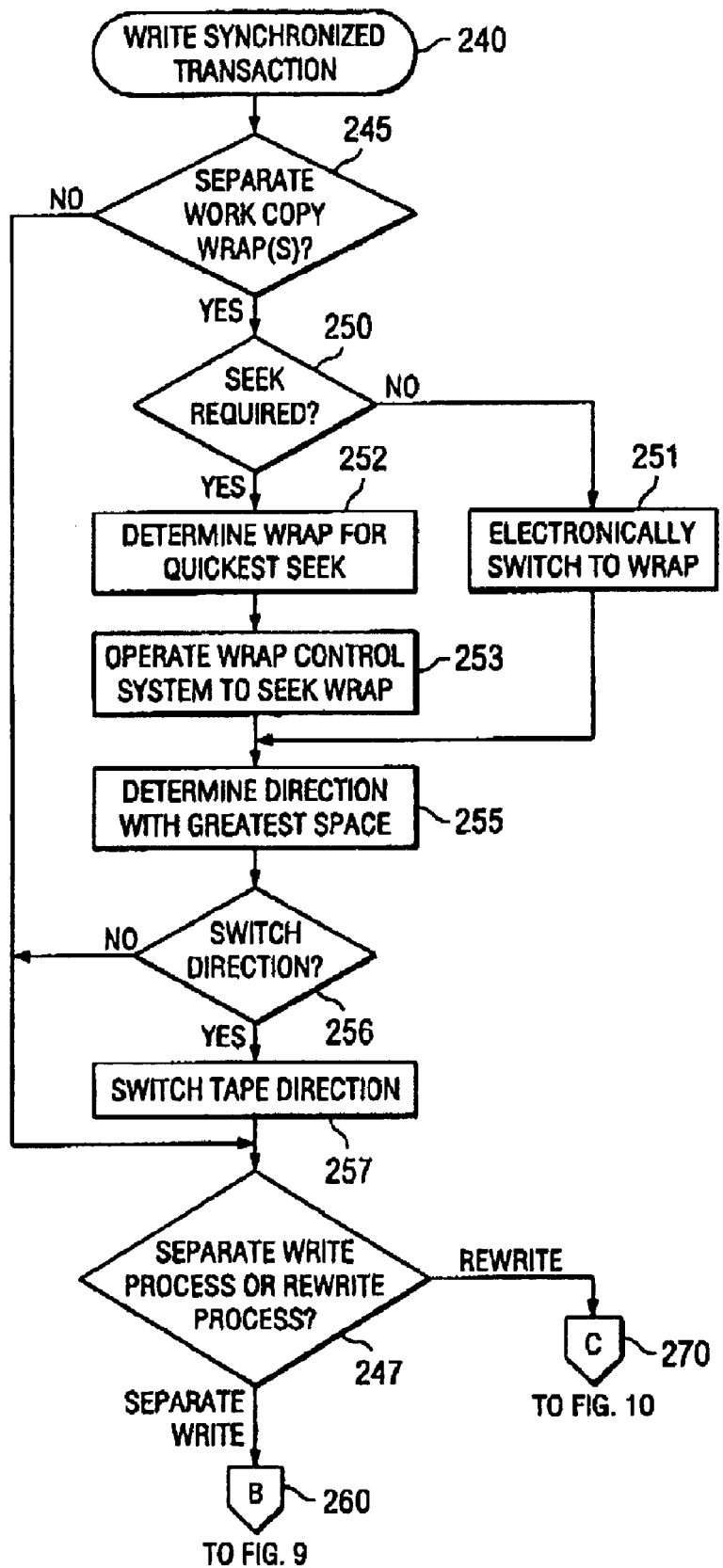
FIG. 8 is a flow chart depicting an embodiment of the method of the present invention for writing the accumulated synchronized data of FIG. 7.
Figure 9:
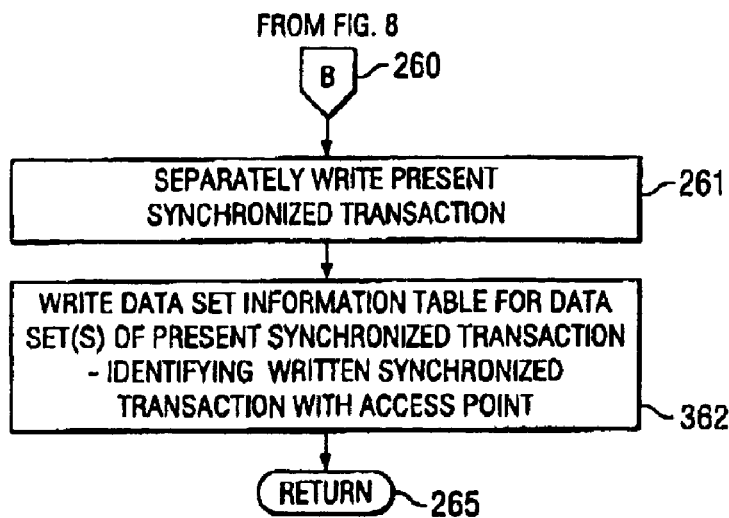
FIG. 9 is a flow chart depicting an embodiment of the method of the present invention for writing the accumulated synchronized data of FIG. 8.
Figure 10:
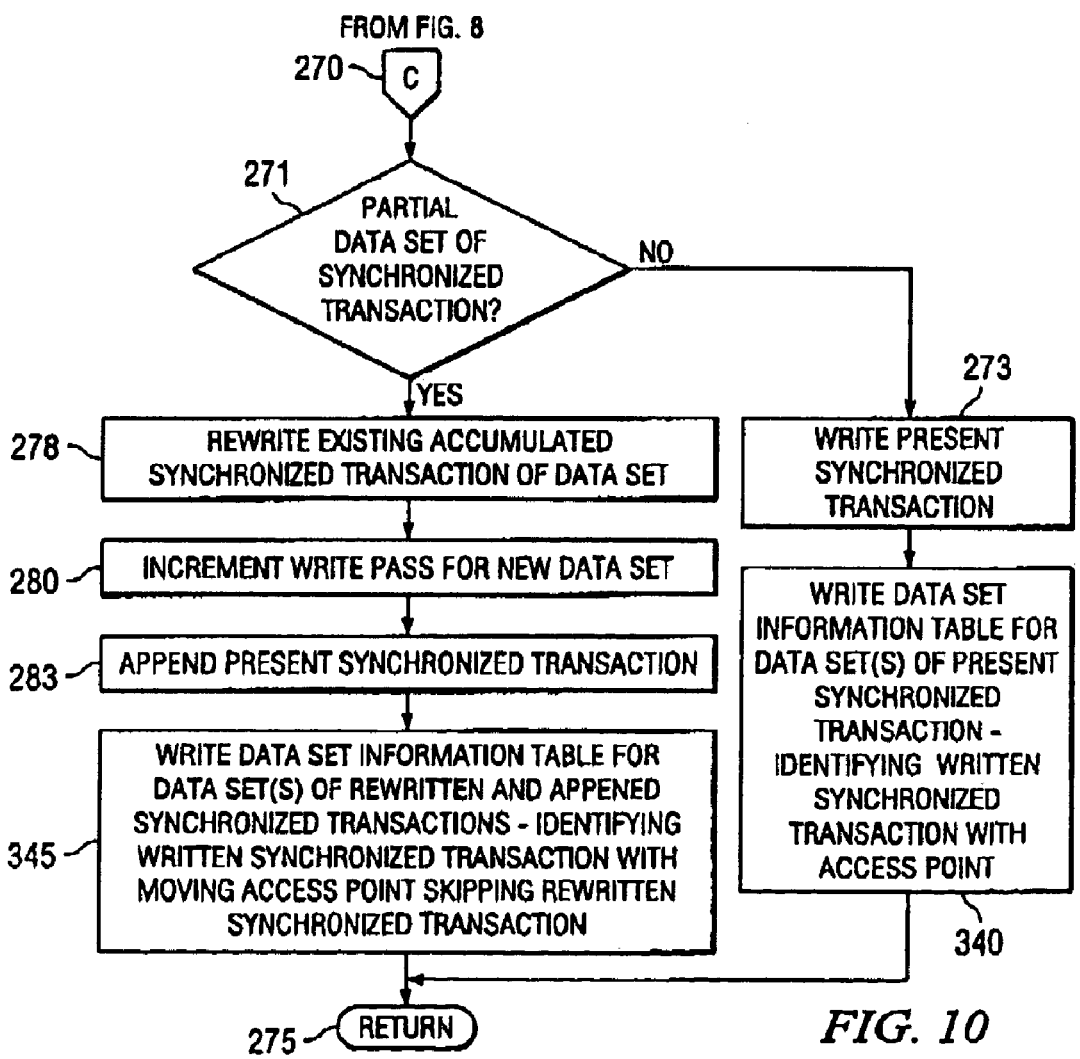
FIG. 10 is a flow chart depicting an alternative embodiment of the method of the present invention for writing the accumulated synchronized data of FIG. 8.

Specific embodiments of step 223 of FIG. 7 are illustrated in FIGS. 8–10, beginning at step 240.

Referring to FIGS. 5 and 8, in step 245, the controller determines whether the magnetic tape comprises a plurality of wraps, such as in an LTO system as discussed above, and whether the work copies are to be written to at least one of the plurality of wraps that is separate from a wrap of the recursive writing. If not, the process proceeds to step 247.

If step 245 determines that accumulating backhitchless wraps, e.g., wraps 180 and 181 of FIG. 5, are to be utilized for work copies, in step 250, as discussed above, the controller operates the wrap control system 27 of FIG. 1 to determine whether access to the work copy wraps requires a seek. If not, the wrap control system, in step 251, electronically switches to a different set of read/write heads. If, in step 250, a seek is required, the controller 18, in step 252, determines the work copy wrap which can be reached by the quickest seek. As discussed above, this may be the closest adjacent available work copy wrap. Then, in step 253, the controller operates the wrap control to conduct the seek and move the head laterally to the selected work copy wrap.

Once the work copy wrap has been selected, the controller, in step 255, as discussed above, determines the writable space of the work copy wrap in each longitudinal direction from the present longitudinal position of the read/write head, and determines the direction having the greatest writable space. The step 255 may precede the wrap selection and occur before step 250. In step 256, the controller determines whether the direction having the greatest writable space is the current direction, and, if so, no change of direction is made. If, however, step 256 determines that the tape direction must be switched, the controller, in step 257, operates the motors 25 to switch the direction of tape motion. In the steps following step 247, the work copies 170–171 are then written on the accumulating backhitchless wraps 180 and 181, first in the direction of arrow 185, and then in the direction of arrow 186, as discussed above with respect to FIG. 8.

Step 247 determines whether the work copies are to be written separately or appended to rewritten copies.

If the work copies are to be written separately, connector 260 leads to FIG. 9, and to step 261. In step 261, the work copy of each synchronized transaction, e.g., of transactions 50–53, of the pattern is written separately from the buffer to the magnetic tape, either as illustrated in FIG. 3, as data sets 80–83, or as illustrated in FIG. 4 as data sets 120–123, each as discussed above.

In accordance with the present invention, in step 362, each separately written transaction data set is provided with a data set information table 302 of FIG. 13, and the transaction is identified with an access point. For example, in FIG. 3, each separately written synchronized transaction 50–53 is identified by means of an access point 110–113, and, in FIG. 4, separately written transaction 50 is identified by means of a normal access point 140. In step 265, the process returns to step 225 of FIG. 7.

If step 247 of FIG. 8 determines that the work copies are to be written as appended to rewritten accumulated synchronized transactions, connector 270 leads to FIG. 10, and to step 271.

Step 271 determines whether there is an existing accumulated synchronized transactions of the detected synchronizing event pattern that has only partially filled a data set. If not, the present transaction starts a new data set, and is written in step 273. As an example, the transaction appears as record or records 50 in partial data set 120 of FIG. 4, followed by DSS 130.

In accordance with the present invention, the data set is provided with a data set information table 302 of FIG. 13 in step 340, and the transaction is identified with an access point. In FIG. 4, separately written transaction 50 is identified by means of a normal access point 140.

The process proceeds to step 275 and returns to step 225 of FIG. 7, where the transaction is accumulated to the buffer, and the process ultimately cycles back to step 271 of FIG. 10 with the next synchronized transaction. Although steps 223 and 225 are shown sequentially, both must happen, either simultaneously or in either order.

Step 271 then determines that there is now an existing partial data set with at least one accumulated synchronized transaction, and, in step 278, rewrites the accumulated transaction(s) of the data set, incrementing the write pass indicator for the data set in step 280, and appending the present synchronized transaction to the rewritten accumulated transactions in step 283. Thus, in FIG. 4, the subsequent transaction 51 is appended to the accumulated transaction 50 and the rewritten accumulated transaction 50 and the new synchronized transaction are written as data set 121, followed by DSS 131, and step 275 returns to step 225 of FIG. 7 and transaction 51 is accumulated in the buffer, etc., as discussed above.

The rewritten and appended written synchronized data set is identified as the most current copy thereof in step 280 by means of an incremented write pass "WP", as discussed above.

In accordance with the present invention, the process moves to step 345, and the written synchronized transaction data set is provided with a data set information table 302 of FIG. 13, and the transaction is identified with a moving access point. For example, in FIG. 4, each rewritten synchronized transaction data set 121–122 having an appended synchronized transaction 51–52 is identified by means of a moving access point 141–142, and the rewrites of the accumulated data records are ignored and the write pass indicator is not updated, as discussed above. Instead, the active record is indicated by the moving access point 141–142.

Figure 11:
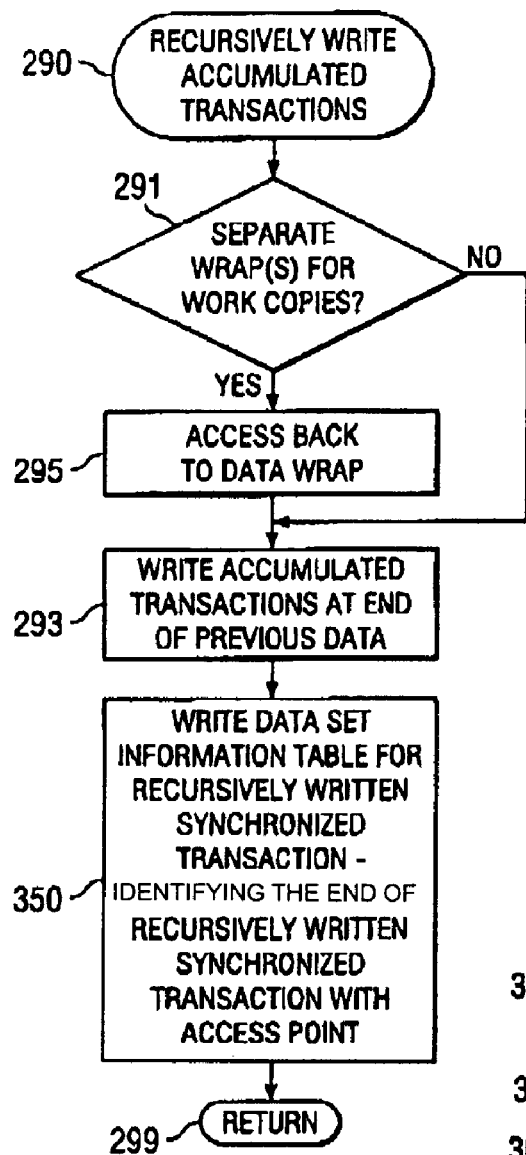
FIG. 11 is a flow chart depicting an embodiment of the method of the present invention for recursively writing the accumulated synchronized data of FIG. 7.

Specific embodiments of step 233 of FIG. 7 are illustrated in FIG. 11, beginning at step 290. Step 291 is similar to step 245 of FIG. 8, and determines whether the work copies have been written to at least one of a plurality of wraps that is separate from any wrap of the recursive writing. If not, the process proceeds to step 293.

If step 291 determines that accumulating backhitchless wraps, e.g., wraps 180 and 181 of FIG. 5, have been utilized, in step 295, as discussed above, the controller operates the wrap control system 27 of FIG. 1 to access the tape head 23 to the standard wrap, either by electronic switching or a seek as above, and the process continues at step 293. In step 293, the wrap control system operates to position the tape head at the end of the previous data at the speed required to write, and the process returns in step 299 to step 233 of FIG. 7 to recursively write the accumulated synchronized transactions from the buffer to the standard wrap 160 immediately after the preceding data 151 in the direction of arrow 161, shown as data sets 190.

In step 350, the recursively written synchronized transaction data set is provided with a data set information table 302 of FIG. 13. Also, the write pass indicators or access points are updated, and the transaction is identified with a moving access point.

The work copies 170–171 may then be overwritten.

As discussed above, in step 233 of FIG. 7, the controller additionally identifies the recursively written transactions as the most current copy thereof, employing in the separately written embodiment of FIG. 3, the access point 115 superseding the identified separately written synchronized data records of the data sets 80–83; in the separately written embodiment of FIG. 4 the access point 148 superseding the identified separately written synchronized data records of the data sets 121–123; and in the rewriting embodiment of FIG. 4, the incrementing the write passes an additional time to, e.g., to "WP3" for data set 145, etc., superseding the identified separately written synchronized transactions of the data sets 121–123.

Again, as the result, should power be lost before the work copies are overwritten, examination of the access points and/or of the write pass indicators will allow a correct recovery to be made.

Figure 15:
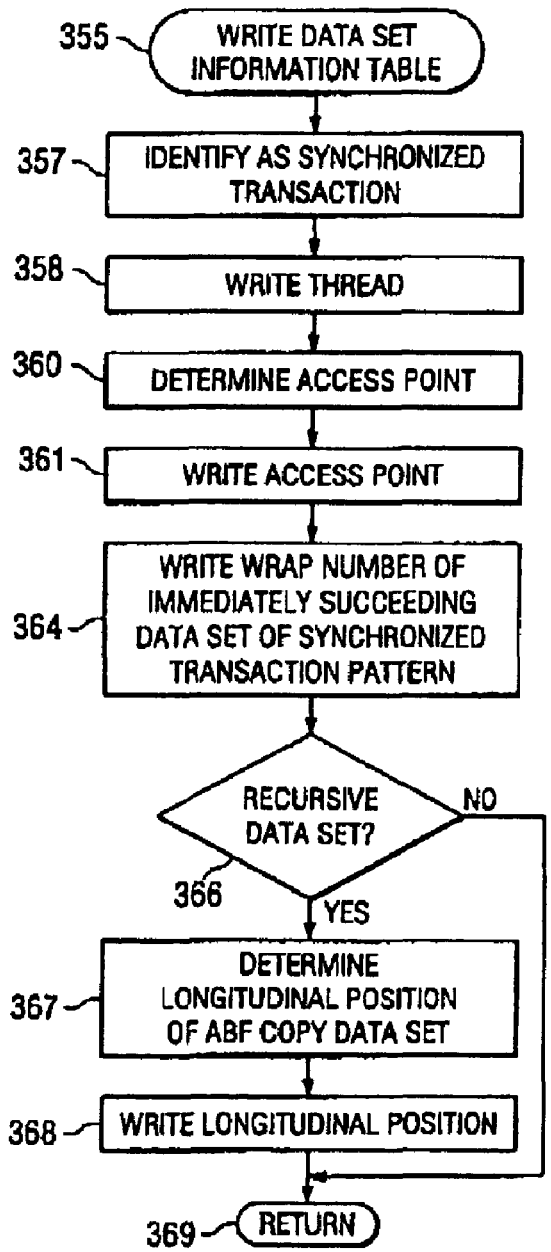
FIG. 15 is a flow chart of an embodiment of the method of the present invention for providing a data set information table of FIG. 13.

An embodiment of the process of writing a data set information table for a synchronized transaction data set is illustrated in FIG. 15, beginning at step 355. In step 357, the data set is identified in field 310 of the data set information table 302 of FIG. 13 as having a synchronized transaction of a detected pattern. Additionally, as discussed above, the remainder of the field indicates the status of the data set in the sequence of the process for writing the synchronized transactions in a sequence of data sets. In one embodiment of the present invention, the identification is of certain data sets which represent the last data set before a transition is made to the next sequence of the process are defined in the status field 310. For example, a data set may be a last data set on the normal wrap before switching to the work copy wraps, may be the last work copy data set on a work copy wrap headed in a first longitudinal direction, may be the last work copy on a second work copy wrap that is headed in the opposite longitudinal direction, or may be the last recursively rewritten data set, such that the process has been completed. Each of these data sets are identified in step 357 by a specific code in the status field 310 of the data set information table 302.

Step 358 writes the thread for the entire string of data sets of the synchronized transactions of a detected pattern, including work copy synchronized transaction data sets and recursively written synchronized transaction data sets. As one example, as discussed above, the thread for the synchronized transactions of the detected pattern, comprises the write pass number 308 of the last data set having a transaction of the pattern written to the magnetic tape as a normal wrap data set, and before the work copy synchronized transaction data sets are written.

Steps 360 and 361 relate to the moving access point of fields 313 and 314 for synchronized transaction data sets. Specifically, in the event one of the written synchronized transactions, such as record 50 of FIG. 4, partially fills a data set, such as data set 120, as discussed above, the controller rewrites the partially filled data set in a succeeding data set, such as data set 121. The controller appends a subsequent synchronized transaction, such as record 51 to the rewritten partially filled succeeding data set 121 as an appended synchronized transaction. Step 360 determines whether a moving access point is required, and, if so, step 361 writes the moving access point for the succeeding data set 121 of FIG. 4 in field 313 of the data set information table 302 of the succeeding data set. The moving access point is an offset, for example, from the beginning of the data set, that identifies the appended synchronized transaction, and is shown as access point 141 in FIG. 4. Thus, in a read recovery process the process would read record 50 at the normal access point 140 of data set 120, and would skip the rewritten synchronized transaction 50 in data set 121. Step 361 additionally writes additional information for the moving access point of field 313, and may comprise the total number of records at the moving access point, the number of file marks, the record count from the moving access point to the end of the transaction or data set, and the file mark count to the end of the transaction or data set.

Step 364 writes a forward pointer in field 316 of the data set information table 302 of FIG. 13. In the example, the forward pointer is to the wrap of the immediately succeeding data set of the synchronized transactions, if any. Thus, if, as is likely, the immediately succeeding data set is on the same wrap, the read recovery process continues reading in the same direction of the same wrap until the next data set is encountered.

Steps 367 and 368 relate to the recursively rewritten data sets. As discussed above, the controller writes the synchronized transactions to work copy wraps of the magnetic tape, likely in the form of spaced apart data sets. The data sets of subsequently recursively written synchronized transactions are copies of the synchronized transactions written to the magnetic tape in a sequence of data sets. Thus, step 366 first determines whether the data set is a recursively rewritten data set, and step 367 determines the backwards pointer 317 of FIG. 13, which is to a longitudinal position on the magnetic tape of a written work copy data set. As an example, the pointer is provided in fields 318 and 319 to the work copy data set of the next synchronized transaction data set to be recursively written. The data set number 307 of the referenced work copy data set is provided in field 319, and the longitudinal position on the magnetic tape of the referenced data set is provided in field 318. If the same fields are provided in other data set information tables, e.g., for the work copy data sets, they are set to all zero, or "0", in those data sets.

The field is then written in step 368 and the process returns to the originating point in step 369.

The full recursive accumulating backhitchless synchronized writing cycle may be considered to have four "corners" at which the status field 310 of FIG. 4 changes. Additionally, other fields provide forward pointers to the location to where the operation continued next, and backwards pointers to the work copies. The thread in field 311 ties together all data sets, working or rewritten, of a given recursive accumulating backhitchless synchronized writing cycle.

Thus, upon a failure requiring a read recovery, the data set information table of the data sets prior to the failure provide a robust set of information allowing the tracing of the data sets and an implementation of the read recovery process to recover the data. The moving access points of field 313 allow the read recovery process to skip rewritten data and to recover the data in an efficient manner.

Backhitchless Writing With Segmentation

To improve access to regions in tape, the tape may be segmented into defined segments between logical points (LPs), which define segments, each having some number of wraps of a tape. A data segment having a shorter longitudinal length than another would have a faster access time, because less time is needed to seek to a location in the shorter longitudinal data segment during a random access operation than is needed to seek to a location in the longer data segment. Further details of dividing data into segments are described in the commonly assigned patent application entitled "Method, System, Program, and Storage Cartridge for Storing Data in a Storage Medium", having U.S. application Ser. No. 09/923,599 and filed on Aug. 6, 2001, which patent application is incorporated herein by reference in its entirety.

In further implementations, the tape may be segmented in such a manner that user data is written to certain segments of the tape and work copies of data are written to separate work copy wraps in different segments than the segments including user data.

Figure 16:
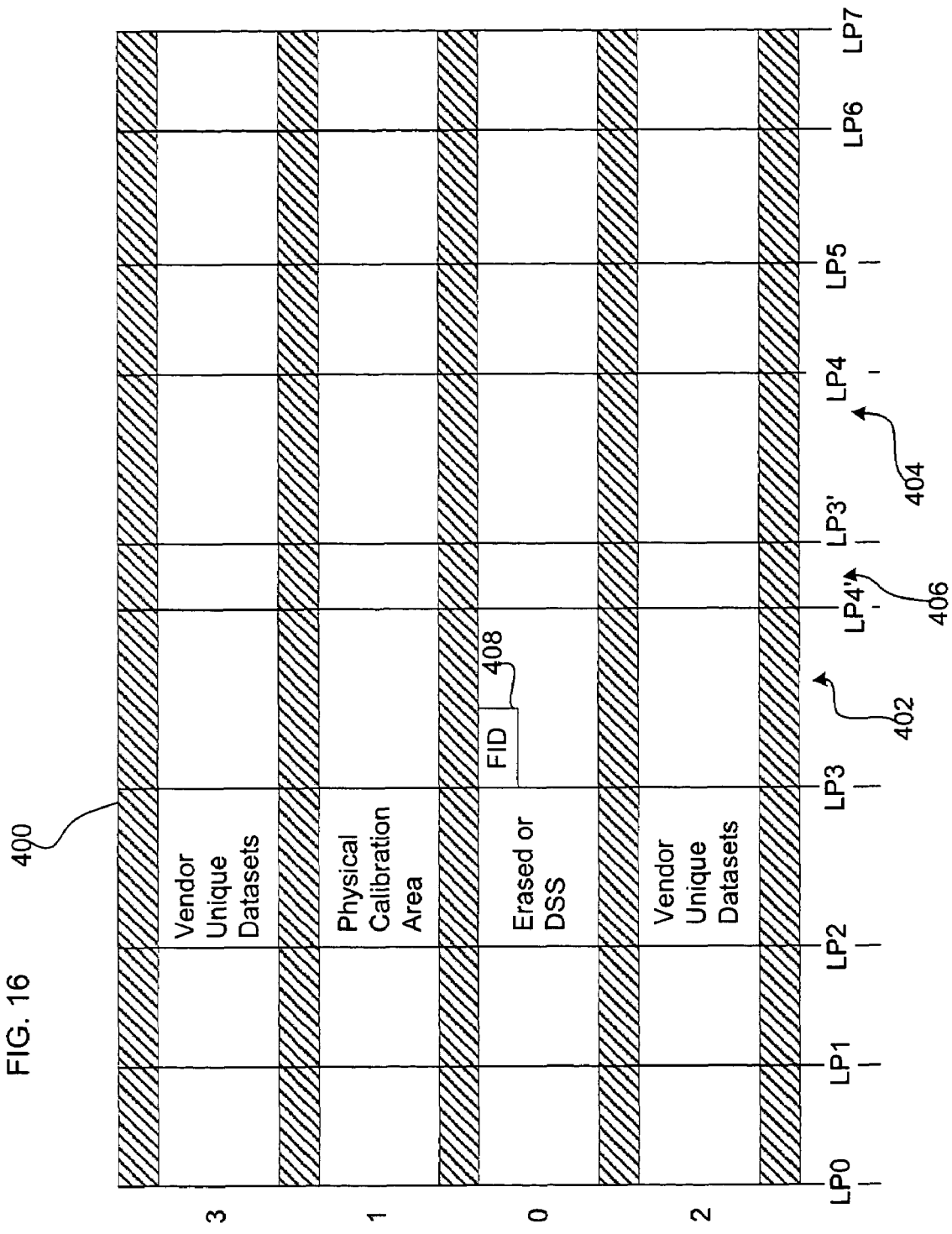
FIG. 16 illustrates the layout of a magnetic tape medium in accordance with implementations of the invention.

FIG. 16 illustrates a layout of a tape format in conformance with the Linear Tape Open (LTO) Ultrium format, which is a serpentine tape format technology. The length of a magnetic tape 400 is divided into logical points (LPs), which define bounds of regions of the tape. The regions of LP0 to LP1 and LP6 and LP7 are unused as they are at the beginning and end of the tape, the region of LP1 to LP2 is a servo acquisition area, LP2 to LP3 is a calibration area that includes different information in the different bands, LP4 to LP5 is the unused part of the user data area, and may have zero length, and LP5 to LP6 is a servo acquisition region for reverse wraps. The layout of FIG. 16 further includes two separate user data segments 402 and 404, extending from LP3 to LP4' and LP3' to LP4, respectively. Data segment 402 and 404 may have the same length or different lengths. For instance, if data segment 402 has a shorter longitudinal length than segment 404, then less time is needed on average to seek from one location to another in data segment 402 during a random access operation than the time required to seek from one location to another in the longer data segment 404. In such implementations, data segment 402 would comprise a faster data access segment where the host application 20 (FIG. 1) can place data accessed more frequently, such as control and configuration data, application data, directory information, and other more frequently accessed data. Further, because the first user data segment 402 is located before the second user data segment 404 on the tape, data in the first user data segment 402 may be accessed faster than data in the second user data segment 404 when seeking from the beginning of the tape.

In one implementation, each of the data segments 402 and 404 include separate serpentine wraps, where each of the four bands has six forward wraps and six backward wraps. In the described implementations, each of the 48 wraps in the data segments 402 and 404 would comprise wrap sections. In this way, 96 wrap sections are equally divided between the two user data segments 402 and 404, where there is one wrap section for the extent of each wrap within a given segment. The user data segment further includes a format identification data set (FID), including information regarding the format of the tape and the tape drive that wrote the FID. The segment 406 between LP4' and LP3' includes debris dumps from data stored in the two segments on either side of it, which thus makes it unsuitable for writing the permanent copy of user data. However, a temporary or working copy of data might be written in this segment because the first thing done after writing temporary or working copies of data is to recursively rewrite them on the standard wraps, and thus there is no time for debris to accumulate on top of the working copy of this data. Thus, this is not an area where data is left permanently such that serpentine motion in adjoining segments has the chance to cause debris accumulation on the top of the data written there.

Figure 17:
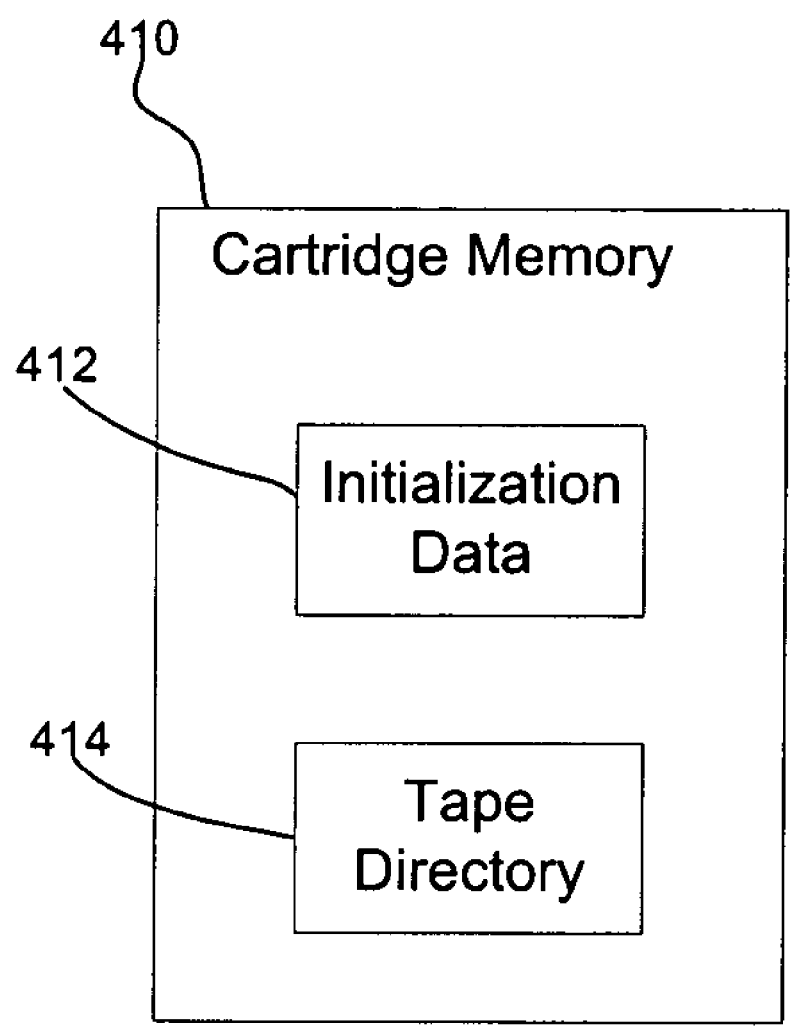
FIG. 17 illustrates a tape cartridge memory used in accordance with implementations of the invention.

Information on the arrangement of the longitudinal position of the logical points and the segmentation of the different data segments may be maintained in a cartridge memory 410 within the tape 14 cartridge, as shown in FIG. 17. FIG. 17 illustrates further details of the data structures in the cartridge memory 410, including initialization data 412 indicating the longitudinal position of all the logical points, including all, or at least a necessary subset of, LP1, LP2, LP3, LP4, LP3', LP4', LP5, LP6, and LP7. The tape drive controller 18 would use the initialization data 410 to determine the start and end of each of the user data segments 402 and 404. The cartridge memory 410 further includes a tape directory table 414 that includes entries for each of the wrap sections. As discussed, in implementations where there are two separate user data segments 402 and 404, the 96 or fewer possible wrap sections would be divided between these two user data segments. Thus, each wrap in the user data segments 402 and 404 would comprise a wrap section. For each of the wrap sections listed in the tape directory table 414, the wrap section entry may specify:

Data Set ID: specifies the Data Set Identity of the last Data Set written in this wrap section. If this wrap section does not contain valid Data Sets, then this field shall be set to (0x0FFFFFFFF).

Record Count: If this Wrap Section is valid, this field shall contain the number of Records that are started in the current Wrap Section. If the Data Set ID of this Wrap Section is (0x0FFFFFFFF) and hence this Wrap Section is invalid, the Record Count field is not defined for interchange.

File Mark Count: If this Wrap Section is valid, this field shall contain the number of File Marks that are within the current Wrap Section. If the Data Set ID of this Wrap Section is (0x0FFFFFFFF) and hence this Wrap Section is invalid, the File Mark Count field is not defined for interchange.

CRC: This field shall specify the CRC generated for the wrap section data in the tape directory table 414.

Additional or different fields may be maintained for wrap sections in the tape directory table 414 to those described above.

The wrap sections would map to the lateral bands extending through the user data segments 402 and 404 in a predefined manner, such that the wrap sections comprise the forward and backward wraps within the data segments 402 and 404. The tape drive controller 18 would utilize the wrap section information in the tape directory table 414 to estimate the longitudinal position within the wrap section of a requested data record. In the described implementations, data is written in a serpentine pattern through the user data segments 50 and 52. FIG. 18 provides a table explaining how data is written in a serpentine pattern in wrap sections through user data segments 402 and 404 in one implementation. In the serpentine pattern of FIG. 18, the first 48 wrap sections, 0–47, alternate writing forward and backward between LP3 and LP4', ending on LP3 in the 48th wrap section (wrap section 47). The next 48 wrap sections are then written in the same serpentine pattern between LP3' and LP4, alternating between forward and backward, and ending on LP3'. With the serpentine pattern implementation of FIG. 18, the tape drive must seek from LP3 to LP3', which as described above may be 80 or more meters apart, at the end of the first user data segment 402 to the beginning of the second user data segment 404.

FIG. 19 illustrates an additional serpentine pattern implementation that eliminates the distance to seek when writing data to the next user wrap section, in this case the 47th wrap section (wrap section 46). In the serpentine pattern of FIG. 19, the tape drive writes in a serpentine pattern, alternating in the forward and backward direction between LP3 and LP4' for the first 47 wrap sections, e.g., wrap sections 0 through 46, which is the same pattern in FIG. 18 for the first 47 wrap sections. However, the pattern of FIG. 19 differs from FIG. 18 in that upon reaching the end of the 47th wrap section (the end of wrap section 46), the tape drive moves from LP4' to LP3' and then starts writing in a serpentine pattern, alternating between the forward and backward direction between LP3' and LP4 in the second user data segment 404. This alternating pattern continues from wrap sections 48 through 94. There is a last possible wrap section 95, which can be written in the backward direction in the first user data segment 52 from LP4 to LP3. This last wrap section 95 may not be usable in certain implementations where shingled writing is used and where the first data segment may be written second. Thus in certain implementations, the last possible wrap section 95 may not be used.

The serpentine pattern of FIG. 19 improves the write performance when writing to wrap sections between the first 402 and second 404 user data segments by avoiding the need to seek from LP3 to LP3' when starting to write wrap section 48 at the beginning of the second user data segment 404. Instead, with the serpentine pattern of FIG. 18, the tape drive needs only seek approximately 2.5 meters when moving from the end of the first user data segment 50 to the beginning of the second user data segment 404. This is a performance improvement over the serpentine pattern of FIG. 18, which requires that the tape drive seek 80 or more meters when moving from the end of the first user data segment 402 to the beginning of the second user data segment 404.

Because the second user data segment 404 is on a length of tape that is beyond the first user data segment 402, the seek time from the beginning of the tape takes longer. Because the user data segment 402 is shorter than is the user data segment 404, the average seek time from one point in user data segment 402 to another in user data segment 402 is shorter than from one point in user data segment 404 to another point in user data segment 404. Thus, from the beginning of the tape or for movements within a wrap section, the first user data segment 402 is accessible faster than is the second segment 404 because the second segment 404 follows the first 402, and the first segment is shorter. Accordingly, data that is more frequently accessed could be placed in the faster access first user data segment 402.

In one implementation, the prior art LTO tape layout format may be modified to format the tape layout format of the described implementations of FIG. 11. For such implementations, to define the second user data segment 404, LP3' may be set to a fixed value, such as 2.5 meters beyond LP4' so long as LP3' is less than LP4, and thus LP5. The LP4 point can then be set out as far as LP5, the end of the user region. Thus, if LP4 is set to 77.5 meters beyond LP3, and LP3' is set to 2.5 meters beyond LP4', then LP3 to LP3' is set to 80 meters. This provides two user data segments, one of 77.5 meters and the other of 500 meters, with a 2.5 meter segment 406 (FIG. 6) separating the two user data segments 402 and 404. A third user data segment would require that the length of LP4 is less than LP5 to allow the definition of a third user data segment between LP4 and LP5, e.g., by the definition of LP3" and LP4".

In implementations where the magnetic tape 400 layout comprises a modification of the LTO Ultrium tape layout, the pages in the cartridge memory 6 and the FID 408 (FIG. 11) may include code or data that would prevent tape drives that only support the standard LTO cartridge format from accessing the cartridge, so that only tape drives 10 that include logic capable of writing to the different user data segments 402 and 404 would access the magnetic tape medium 400.

Further details of how to utilize the wrap section information to write to segments is disclosed in the patent application "Method, System, Program, and Storage Cartridge for Storing Data in a Storage Medium", having U.S. application Ser. No. 09/923,599, which patent application was incorporated herein by reference above.

Figure 20:
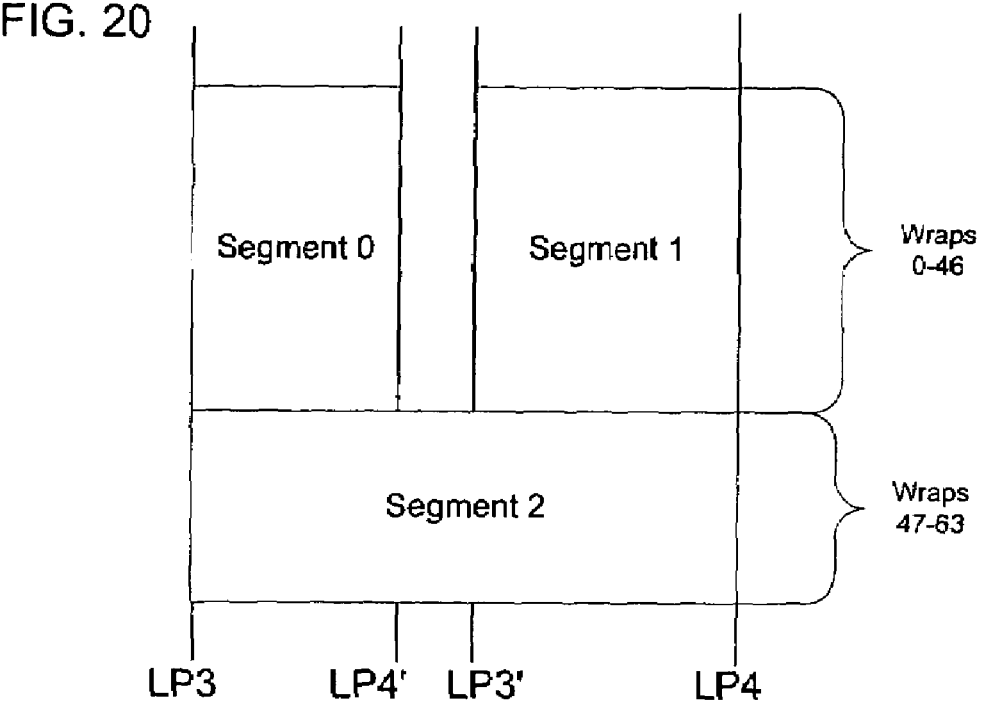
FIGS. 20, 21, 22a, and 22b illustrate how segments defined within the layout of the magnetic tape medium of FIG. 16.

FIG. 20 illustrates how segments may be superimposed longitudinally over the LP3–LP4 user data region, though the lateral depiction is conceptual rather than actual. That is Segment 2 comprises 17 wraps, but they may not be grouped to one side of the tape laterally but may instead be distributed across the lateral extent of tape 4. As an example there may be a minimum of 4 wraps of Segment 2 in each data band. This conceptual aspect to lateral distribution is for purposes of illustration only, and is used also in FIG. 21, FIG. 22*a*, and FIG. 22*b*. Hereafter the concept of 'lower' wraps, or ones 'below' refers to the conceptual organization represented by the figure, not the actual wrap layout on tape. Thus the lower wraps of FIG. 20 are the wraps which logically may be wraps from a segment depicted as lower in the figure (e.g. Segment 2) or may represent wraps within a segment which are written later in the serpentine, and has no relation to where they actually are located physically. A first segment 0 comprises the first 47 wraps between LP3 and LP4' and a second segment 1 comprises the first 47 wraps between LP3' and LP4. Segment 3 extends between LP3 and LP4 in the lower 17 wraps, thus extending through the debris segment LP4'–LP3'. When writing user data in a normal sequential streaming mode, the tape driver controller 18 may first write user data serpentining through all the wraps extending within the confines of segment 0 and then through the wraps extending within the confines of segment 1. As described above, if the tape driver controller 18 detects a pattern of synchronous writes, then the writes are accumulated in the buffer 30 (FIG. 1) and the controller 18 and wrap control 27 seeks to the lower work copy wraps in segment 2 to write backhitchless work copies of the accumulated data as well as filler patterns to segment 2, writing across the entire lengths of the selected wraps of the 17 wraps which comprise Segment 2 between LP3 and LP4. FIG. 8 illustrates the writing of the work copies. As mentioned, after writing the work copies of synchronous writes, the controller 18 may return Command Complete to the host. When the buffer 30 reaches a full threshold, then the tape drive controller 18 would stop writing to the work copy wraps and then laterally seek to the position in one of the user data segments 0 and 1 following the last written block to begin streaming the accumulated data from the buffer 30.

In further implementations, after segments 0 and 1 fill with user data, the tape driver controller 18 may start writing data to a group of upper wraps within segment 2 and designate a group of lower wraps, such as the last two wraps, for writing of work copies if synchronous write mode is detected. In this way, the 17 wraps of segment 2 may be broken into 15 standard wraps for recursively rewriting the final copy of user data, and two wraps for writing in accumulating backhitchless flush (ABF) mode to write synchronized transactions to tape without backhitching between each one of them. After filling the 15 standard wraps of segment 2, the final two wraps may be written with the final user data, but it may be that no ABF wraps are available when writing to these wraps, and thus they may need to be written without the performance benefit of backhitchless writing. Alternately, these last two wraps may be left unused, thereby reducing the cartridge capacity slightly. At this time, synchronous writes would have to be written with backhitching if there are no work copy wraps available or the tape can be marked as full.

Figure 21:
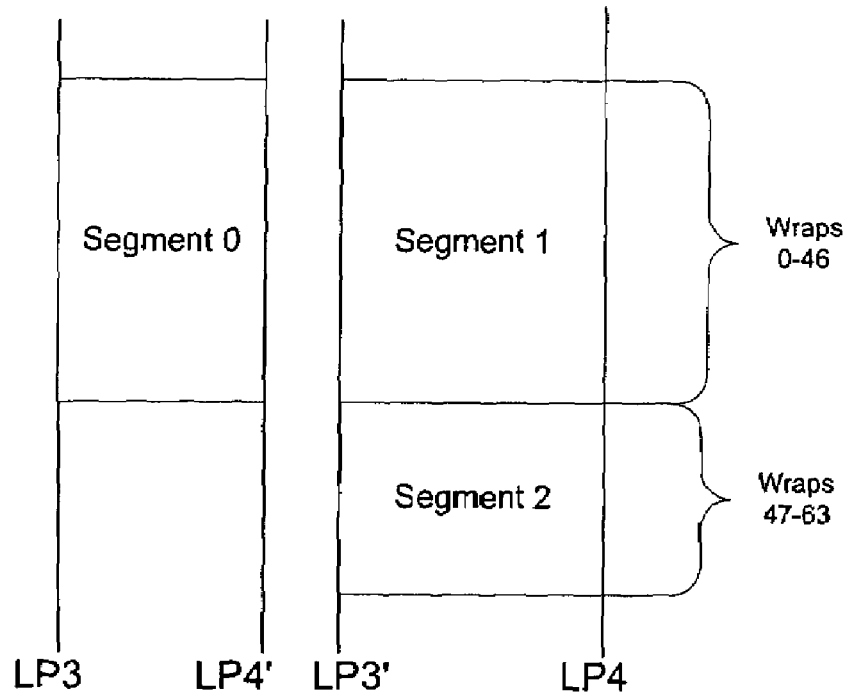

FIG. 21 illustrates an alternative layout of the segments where segment 2 does not extend through a debris segment between LP4' and LP3', but only extends from LP3' to LP4. In such implementations, if user data is being written to segment 2 between LP3' and LP4, such as to the first 14 wraps, then the work copies may be written across the entire length of the last two work copy (backhitchless) wraps from LP3 to LP4, even though the user data in segment 2 is only recursively written between LP3' and LP4. Further, if the last backhitchless work copy wraps of segment 2 are to be subsequently used for user data, then if synchronous mode is detected, work copy data may be written between LP3 to LP4', or even between LP3 to LP3', if it is advantageous to do so. However, because the new backhitchless wrap section is less than an entire wrap, the buffer 30 may not fill before the end of the backhitchless wrap is reached. In such case, when the end of the backhitchless wrap is reached, backhitchless writing would end and the buffer would be written as user data. Once the buffer 30 is emptied, backhitchless writing can then resume on one of the backhitchless work copy wraps.

Figure 22A:
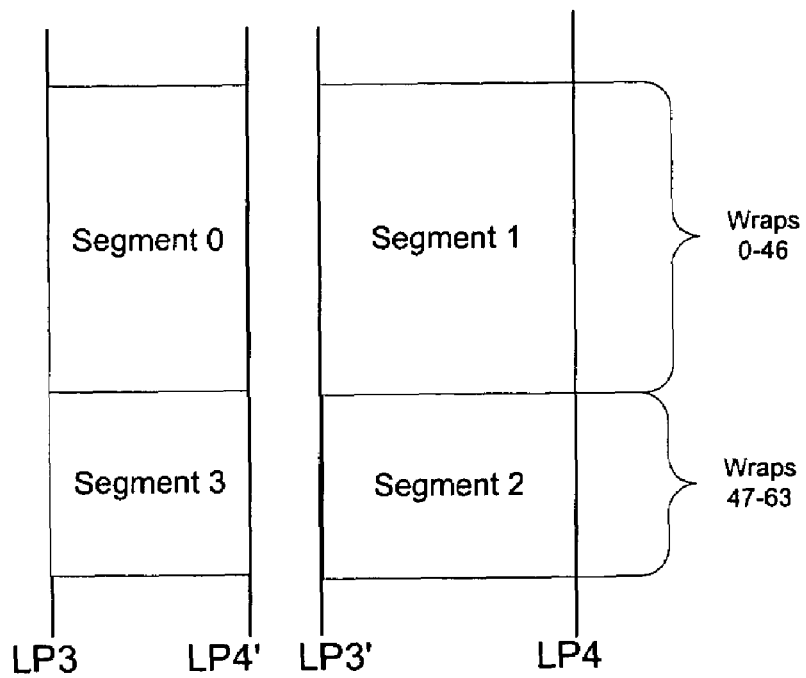

FIG. 22*a* illustrates a still further implementation of the layout where a fourth segment 3 is added to the region between LP3 to LP4' to provide a still additional segment of user data. Once segment 2 (extending between LP3' and LP4) is filled with user data, then the controller 18 may write user data to the upper wraps of segment 3, such as the first 15 wraps, and use the lower wraps in segment 3, such as last two wraps, for backhitchless work copy writing, which may extend from LP3 to LP4', or even between LP3 to LP3'. In either case, when the backhitchless writing can only occur before LP3, the backhitchless work copy wraps may become filled with work copies before the buffer is full. In such case, when the end of the backhitchless work copy wraps are full, the data must be rewritten to free up the work copy wraps for further use the buffer 30.

Figure 22B:
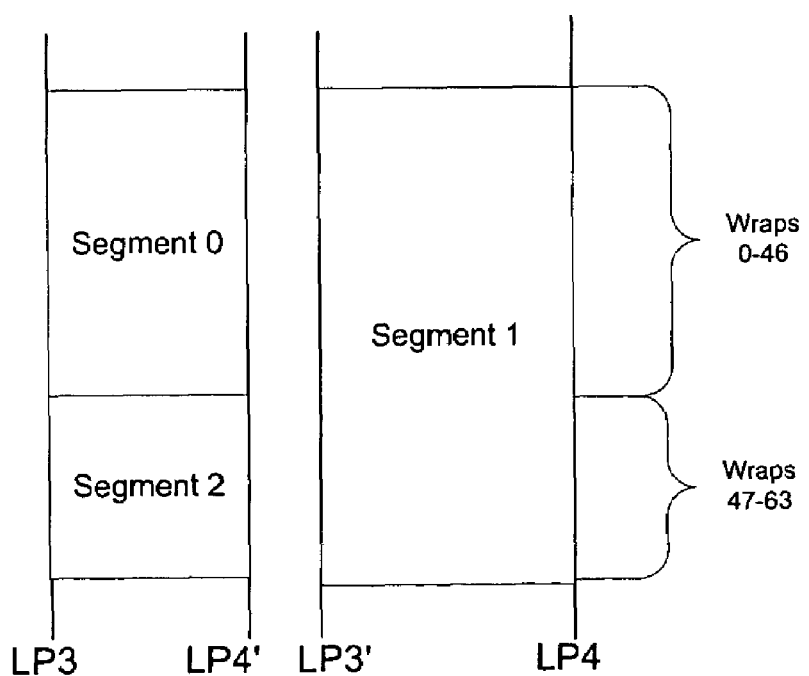

FIG. 22*b* illustrates a still further implementation of the layout where segment 0 extends from LP3 to LP4' in the first 47 and segment 1 extends in all 64 wraps between LP3' and LP4, and segment 2 extends between LP3 and LP4' in the lower 17 wraps. As segment 0 is being filled, backhitchless work copies may be written to the lower wraps of segment 0, or to any of the segment 2 wraps, except that they can be written full length (LP3 to LP4). Once segment 0 is filled and as user data is written to the upper wraps of segment 1, backhitchless work copies may be written to available full length wraps (from LP3 to LP4) in the lower wraps of wraps 48–64. Once segment 1 is filled, user data is written to segment 2, and backhitchless work copy writing may occur within the confines of segment 2 or not occur at all.

Figure 23:
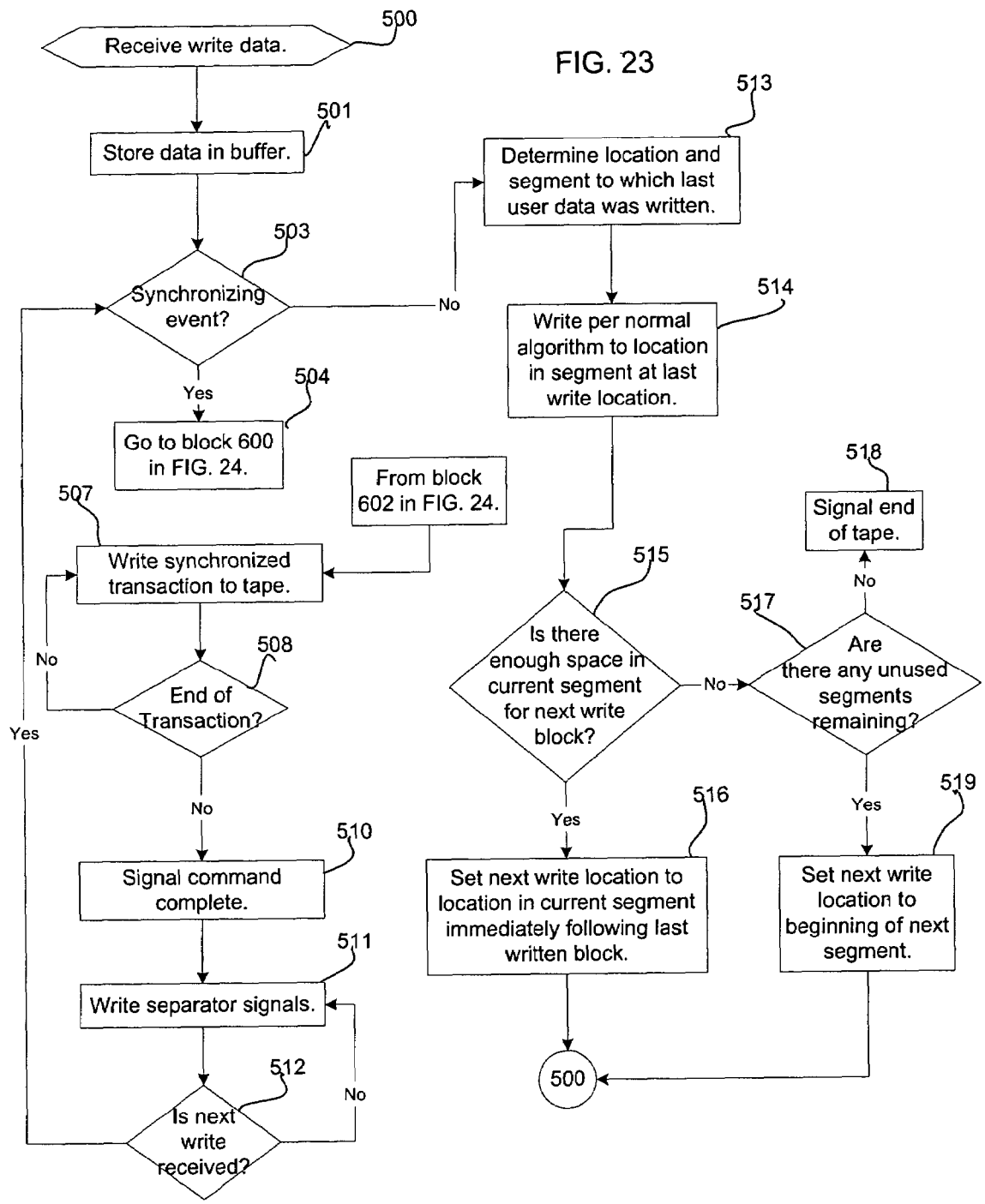
Figure 24:
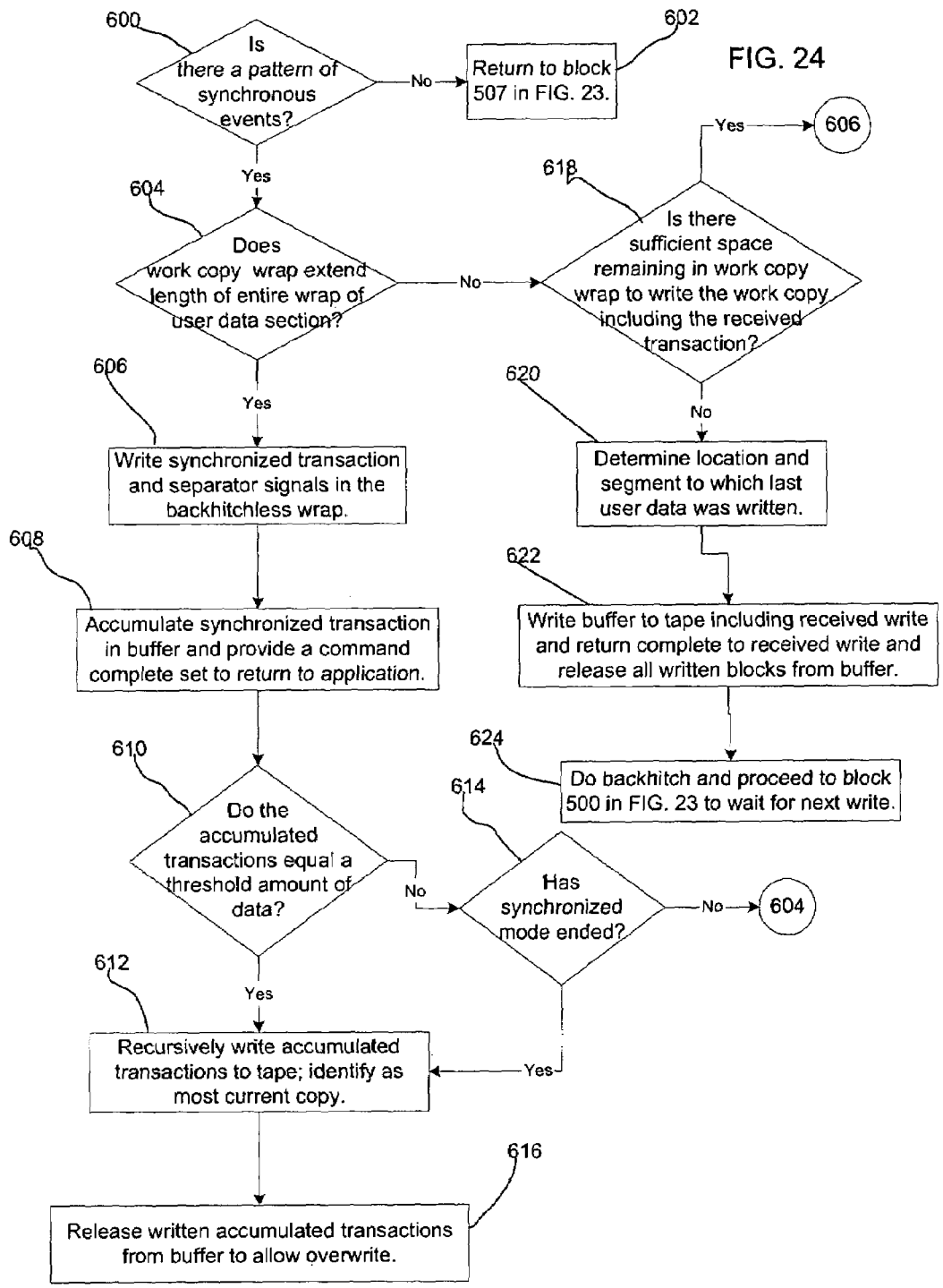

FIGS. 23 and 24 illustrate operations performed in the tape driver controller 18 to manage writes to the tape 400 medium when the tape format may include multiple segments. With respect to FIG. 23, operations 500, 501, 503, 507, 508, 510, 511, and 512 are substantially the same as the operations 200, 201, 203, 207, 208, 210, 211, and 212, respectively, in FIG. 6 to detect and write a synchronized transaction if there is no pattern of synchronized writes detected. If (at block 503) the received write is a synchronous write, then control proceeds (at block 504) to block 600 in FIG. 24 for further checking. If (at block 503) the received write is not a synchronous write, then the controller 18 determines (at block 513) the location and segment following the block to which user data was last written, e.g., segment 0, 1, 2, etc., and writes (at block 514) per the normal algorithm to the location following the block to which user data was last written. If (at block 515) there is sufficient space in the current segment for the next write block, then the controller 18 sets (at block 515) the next write location to the location in the current segment immediately following the last written block so that data is written sequentially in a serpentine manner through the wraps of the segments. Otherwise, if (at block 515) there is not sufficient space and if (at block 517) there are no unused segments remaining, i.e., user data has been written to fill segments 0, 1, and 2 (FIGS. 15 and 16) or segments 0, 1, 2, and 3 (FIG. 17), then the end of tape is signaled (at block 518). Otherwise, if there is an available segment, then the next write location is set (at block 519) to the beginning of the next segment to fill the next segment with user data. From block 516 or 519, control proceeds back to block 500 to process the next write.

With the logic of FIG. 23, user data is written through the longitudinal extent of the wraps of the segments until all the segments are filled with user data. In alternative implementations, the tape may be signaled as full after writing user data to the upper wraps, e.g., segments 0 and 1, or after filling the upper 14 wraps of the lower region (wraps 48–67) having segments 2 and 3, so that backhitchless work copy wraps are always available and the controller 18 avoids having to perform a backhitch.

FIG. 24 includes many of the operations found in FIG. 7, such that operations 600, 606, 608, 610, 612, 614 and 616 in FIG. 24 correspond to operations 220, 223, 225, 230, 231, 233, and 235 in FIG. 7. However, in FIG. 24, before writing the work copy at block 607, where details of writing the work copy are described with respect to FIG. 8, the controller 18 determines (at block 604) whether the work copy wrap extends the length of the entire user data segment, e.g., LP3 to LP4. In certain implementations, if backhitchless work copies can be written the entire length of the user data segment (e.g., from LP3 to LP4), then by the time an entire work copy wrap is written, the buffer 30 should be full and recursively written (at block 612). If the backhitchless work copy wrap extends the entire length, then control proceeds 606 to write the work copy. Otherwise, if the work copy wrap does not extend the entire length of the user data segment (LP3 to LP4) and if (at block 618) there is sufficient space remaining in the copy wrap to write the work copy including the received transaction, then control proceeds to block 606 to write the work copy. Otherwise, if there is not sufficient space, then the controller 18 determines (at block 620) the location and segment to which last user data was written and writes (at block 622) all the accumulated writes in the buffer 30 to tape including the received write, returns complete to the received write, and releases all accumulated writes in the buffer 30. The controller 18 then performs a backhitch to stop at the location following the last written block and proceed back to block 500 in FIG. 23 to wait for the next write. After the accumulated writes in the buffer 30 are written out to tape, then the next written work copy can be written to the beginning of the work copy wrap, overwriting previously written work copies.

As discussed, in certain implementations, user data may be written only to the first 15 wraps of segments 2 and 3, with the other two wraps being reserved for accumulated backhitchless writing to enable backhitchless mode writing on the first 15 wraps. FIG. 25 illustrates operations the controller 18 performs to determine whether to modify the definition of the work copy wraps when writing user data. The location of the backhitchless work copy wraps in tape may be defined within the cartridge memory 410. When writing (at block 650) user data, if (at block 652) data is not being written to a segment in the lower 17 wraps, e.g., segments 2 and 3, then control ends. Otherwise, if data is not being written to the beginning of a segment in the lower 17 wraps or written to the beginning of the work copy wraps (at block 658), then control ends. Otherwise, if (at block 656) the user data is being written to the beginning of the work copy wraps, then the controller 18 defines (at block 660) the work copy wraps to be the longitudinal region of the lower two wraps that excludes the length of one or more segments in the lower 17 wraps to which user data is written. For instance, if user data is written to the lower 2 wraps of segment 2 (in FIGS. 16 and 17), then the work copy wrap section would be defined as the length from LP3 to LP4', or even from LP3 to LP3', thereby excluding any written user data from the backhitchless work copy wrap. As discussed, if the length of the work copy wrap is reduced, then the work copy wrap may be filled before the buffer 30 reaches a threshold amount, thereby requiring the writing of the accumulated data in the buffer and a backhitch (at blocks 618, 620, 622, and 624). If (at block 662) user data has not been written to the last two wraps, then the work copy wraps are set to the entire length of the lower two wraps, e.g., extending from LP3 to LP4. If all the segments are filled with user data, then the tape is full.

While it is advantageous to use wraps in the lateral part of tape which will become Segment 2 (and potentially Segment 3), the actual extent of ABF writing is ideally from LP3 to LP4—which means extending longitudinally greater than either Segment 2 or 3. Also, even this is overly restrictive in that there are 47 wraps in Segment 0—and as we fill to wrap N, we can always ABF write to 2 wraps>N until we write wrap 45, and now we don't have 2 free wraps. When Segment 0 is full, then the only way to write LP3 to LP4 is in the Segment 2 and 3 wraps.

In still further implementations, the backhitchless writing may occur in the lower wraps of the upper 47 wraps between LP3 and LP4 in segments 0 and 1 while user data is being written to any wraps within segments 0 and 1 except the last two wraps extending through these segments (between LP3 and LP4 in wraps 46 and 47). Once one of the entire upper segments 0 or 1 is filled, then accumulated backhitchless writing would be performed in wraps in the lower 17 wraps, extending between LP3 and LP4. In this way, any full wraps extending through any segments, e.g., from LP3 to LP4, that do not include any user data may be used for backhitchless writing.

Additional Implementation Details

The described techniques for writing data to tape may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described implementations, an upper region of the wraps was described as having 47 wraps and a lower region having 17 wraps. In alternative implementations, the upper and lower regions may comprise a different number of wraps. Further, when writing user data to the segments in the lower regions, e.g., segments 2 and 3, the backhitchless work copy wraps are described as located in the bottom two wraps when writing user to the segments in the lower region. In alternative implementations, the work copy wraps may be defined in wraps other than the lower two wraps as described.

In described implementations, there are two segments in the upper 47 wraps and one or two segments in the lower 17 wraps. Additionally, there may be any number of segments in the upper and lower regions. Further, segments in the upper region may be non-overlapping with respect to segments in the lower region.

In the described implementations, the data is first written to the first user segment and after that segment fills, to the second user data segment. In alternative implementations, data may be written to the second user data segment before the first is completely filled. This may be accomplished by predefining a number of blocks, N, in the first segment (e.g. 100000 records) and handle it such that a Space or Locate to the N+1 (100001th) Record, or to End of Data (EOD) will position one to the start of the second user data segment, from which one can begin writing. Similarly a Space or Locate to block 0, or a Rewind, will position to the start of the first segment. In this way, the first user data segment could be updated after the second user data segments. Further, the whole serpentine may be processed in the backwards direction in order to start with the end of the second segment and work backwards. In such implementations, the first and second user data segments are part of a same logical partition that is still multi-segmented, not multi-partitioned.

In the described implementations, there were 96 wrap sections equally divided between two different user data segments 402 and 404, where the tape drive controller 18 first writes data in a serpentine pattern to the forward and backward wraps in the first user data segment 402 and then, after filling the first user data segment 402, writes data in a serpentine pattern to the forward and backward wraps in the second user data segment 404. In additional implementations, there may be more than two user data segments, where the initialization data 412 would provide additional logical points for additional user data segments. In such cases, the 96 wrap sections may be divided among the three or more user data segments. Still further, the tape directory and other page information in the cartridge memory may define additional or fewer wrap sections than the 96 described herein as dispersed among the multiple user data segments.

In the described implementations, data was organized into wrap sections in the user data segments. In alternative implementations, the data in the user data segments may be organized into physically consecutive groups of tracks other than wrap sections.

The host 20 may communicate with the tape drive 10 using SCSI commands or any other data transfer protocol known in the art.

FIGS. 18 and 19 illustrate serpentine patterns that may be followed when writing data to wrap sections in the first 402 and second 404 user data segments. However, those skilled in the art will appreciate that different serpentine patterns may be used when writing data to the wrap sections in the user data segments 402 and 404.

In the described implementations, the directory information is stored in cartridge memory. In alternative tape implementations, such as tape cartridges that do not include a cartridge memory device, the directory information may be stored on tape or on a host system.

The described implementations provide a technique for transferring data to a tape drive. Additionally, the above described logic may be used with other input/output (I/O) devices or other storage devices, e.g., optical tape.

The described implementations utilized serpentine Linear Tape Open (LTO) technology. In alternative implementations, alternative tape technologies may be used, such as helical-scan tape drive that read/write vertical or diagonal tracks on the tape using a rotating read/write head and parallel tape drives that read/write tracks in parallel during one scan through the tape. The described implementations may be utilized with Digital Linear Tape (DLT), Quarter Inch Cassette (QIC), Travan, and any other tape technology known in the art.

The described implementations describe a specific format for writing user data and work copies in FIGS. 2, 3, and 4. In alternative implementations, the format of the written user data and work copy may differ.

The operations described in FIGS. 7, 8, 9, 10, 11, 14, 15, 23, 24, and 25 describe specific operations as occurring in a particular order. In alternative implementations, certain of the logic operations may be performed in a different order, modified or removed and still implement preferred embodiments of the present invention. Morever, steps may be added to the above described logic and still conform to implementations of the invention.

The foregoing description of the preferred embodiments of the invention has been presented for the purposes of illustration and description. It is not intended to be exhaustive or to limit the Invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for writing data in a tape medium having wraps, comprising:

providing a layout of the tape including at least one segment within a full available length of a first set of wraps for writing user data and at least one segment within a full length of a second set of wraps for writing a work copy of the user data;

receiving user data to write to the tape medium;

detecting whether data writing is occurring in a specified write mode;

if the data writing is not occurring in the specified write mode, then writing the received user data to one segment in the first set of wraps;

if the data writing is occurring in the specified write mode, then writing a work copy to available full length wraps not having user data.

2. The method of claim 1, wherein the specified write mode comprises a synchronous write mode.

3. The method of claim 2, wherein the received user data comprises a synchronous write, wherein the work copy includes a copy of the received user data, and further comprising:

returning complete to the received synchronous write after writing the work copy in the second set of wraps.

4. The method of claim 1, wherein the first set of wraps comprises a series of adjacent wraps and the second set of wraps comprises a series of adjacent wraps with respect to the wraps in the first set.

5. The method of claim 1, further comprising:

accumulating the received user data in a buffer when writing work copies; and writing all the accumulated user data in the buffer to at least one segment in the first set of wraps if the buffer reaches a threshold amount of data or if data is no longer being written in the specified write mode.

6. The method of claim 5, further comprising:

if there is no space for further work copies on the wraps to which the work copies are being written, then writing the accumulated data in the buffer and the received data to one segment; and performing a backhitch to wait for the next received user data to write.

7. The method of claim 1, wherein the first set of wraps includes at least two segments, further comprising:

if one segment in the first set of wraps becomes full of user data, then writing received user data to another available segment in the first set of wraps.

8. The method of claim 1, further comprising:
if there are no available segments in the first set of wraps for user data, then writing user data to one segment in the second set of wraps.

9. The method of claim 8, wherein the work copy wraps are written to an available full length wraps in the second set of wraps not having user data.

10. The method of claim 8, further comprising:
if there are no available full length wraps, then writing work copies to wraps within one segment in the second set of wraps that does not include user data.

11. The method of claim 8, wherein the second set of wraps includes at least two segments, wherein the work copies are written to at least two of a lower wraps in the second set of wraps, and further comprising:
if user data is written to the at least two lower wraps in one segment in the second set of wraps, then writing the work copies to the at least two lower wraps in an additional segment in the second set of wraps that does not overlap with any portion of a wrap that includes user data written when writing is not occurring in the specified write mode.

12. The method of claim 1, wherein data is written in a serpentine manner through wraps in the segments within longitudinal boundaries in the wrap defined by the segment, and wherein after writing user data to all wraps in a segment, writing user data to the wraps in an additional available segment.

13. A system for writing data in a tape medium having wraps, comprising:
means for providing a layout of the tape including at least one segment within a full available length of a first set of wraps for writing user data and at least one segment within a full length of a second set of wraps for writing a work copy of the user data;
means for receiving user data to write to the tape medium;
means for detecting whether data writing is occurring in a specified write mode;
means for writing the received user data to one segment in the first set of wraps if the data writing is not occurring in the specified write mode; and
means for writing a work copy to available full length wraps not having user data if the data writing is occurring in the specified write mode.

14. The system of claim 13, wherein the specified write mode comprises a synchronous write mode.

15. The system of claim 14, wherein the received user data comprises a synchronous write, wherein the work copy includes a copy of the received user data, and further comprising:
means for returning complete to the received synchronous write after writing the work copy in the second set of wraps.

16. The system of claim 13, wherein the first set of wraps comprises a series of adjacent wraps and the second set of wraps comprises a series of adjacent wraps with respect to the wraps in the first set.

17. The system of claim 13, further comprising:
means for accumulating the received user data in a buffer when writing work copies; and
means for writing all the accumulated user data in the buffer to at least one segment in the first set of wraps if the buffer reaches a threshold amount of data or if data is no longer being written in the specified write mode.

18. The system of claim 17, further comprising:
means for writing the accumulated data in the buffer and the received data to one segment if there is no space for further work copies on the wraps to which the work copies are being written; and
means for performing a backhitch to wait for the next received user data to write.

19. The system of claim 13 wherein the first set of wraps includes at least two segments, further comprising:
means for writing received user data to another available segment in the first set of wraps if one segment in the first set of wraps becomes full of user data.

20. The system of claim 13, further comprising:
means for writing user data to one segment in the second set of wraps if there are no available segments in the first set of wraps for user data.

21. The system of claim 20, wherein the work copy wraps are written to an available full length wraps in the second set of wraps not having user data.

22. The system of claim 20, further comprising:
means for writing work copies to wraps within one segment in the second set of wraps that does not include user data if there are no available full length wraps.

23. The system of claim 20, wherein the second set of wraps includes at least two segments, wherein the work copies ate written to at least two of a lower wraps in the second set of wraps, and further comprising:
means for writing the work copies to the at least two lower wraps in an additional segment in the second set of wraps that does not overlap with any portion of a wrap that includes user data written when writing is not occurring in the specified write mode if user data is written to the at least two lower wraps in one segment in the second set of wraps.

24. The system of claim 13, wherein data is written in a serpentine manner through wraps in the segments within longitudinal boundaries in the wrap defined by the segment, and wherein after writing user data to all wraps in a segment, writing user data to the wraps in an additional available segment.

25. An article of manufacture for writing data in a tape medium having wraps, wherein the article of manufacture causes operations to be performed, the operations comprising:
providing a layout of the tape including at least one segment within a full available length of a first set of wraps for writing user data and at least one segment within a full length of a second set of wraps for writing a work copy of the user data;
receiving user data to write to the tape medium;
detecting whether data writing is occurring in a specified write mode;
if the data writing is not occurring in the specified write mode, then writing the received user data to one segment in the first set of wraps;
if the data writing is occurring in the specified write mode, then writing a work copy to available full length wraps not having user data.

26. The article of manufacture of claim 25, wherein the specified write mode comprises a synchronous write mode.

27. The article of manufacture of claim 26, wherein the received user data comprises a synchronous write, wherein the work copy includes a copy of the received user data, wherein the operations further comprise:
returning complete to the received synchronous write after writing the work copy in the second set of wraps.

28. The article of manufacture of claim 25, wherein the first set of wraps comprises a series of adjacent wraps and the second set of wraps comprises a series of adjacent wraps with respect to the wraps in the first set.

29. The article of manufacture of claim 25, wherein the operations further comprise:
- accumulating the received user data in a buffer when writing work copies; and
- writing all the accumulated user data in the buffer to at least one segment in the first set of wraps if the buffer reaches a threshold amount of data or if data is no longer being written in the specified write mode.

30. The article of manufacture of claim 29, wherein the operations further comprise:
- if there is no space for further work copies on the wraps to which the work copies are being written, then writing the accumulated data in the buffer and the received data to one segment; and
- performing a backhitch to wait for the next received user data to write.

31. The article of manufacture of claim 25, wherein the first set of wraps includes at least two segments, and wherein the operations further comprise:
- if one segment in the first set of wraps becomes full of user data, then writing received user data to another available segment in the first set of wraps.

32. The article of manufacture of claim 25, wherein the operations further comprise:
- if there are no available segments in the first set of wraps for user data, then writing user data to one segment in the second set of wraps.

33. The article of manufacture of claim 32, wherein the work copy wraps are written to an available full length wraps in the second set of wraps not having user data.

34. The article of manufacture of claim 32, wherein the operations further comprise:
- if there are no available full length wraps, then writing work copies to wraps within one segment in the second set of wraps that does not include user data.

35. The article of manufacture of claim 32, wherein the second set of wraps includes at least two segments, wherein the work copies are written to at least two of a lower wraps in the second set of wraps, and wherein the operations further comprise:
- if user data is written to the at least two lower wraps in one segment in the second set of wraps, then writing the work copies to the at least two lower wraps in an additional segment in the second set of wraps that does not overlap with any portion of a wrap that includes user data written when writing is not occurring in the specified write mode.

36. The article of manufacture of claim 25, wherein data is written in a serpentine manner through wraps in the segments within longitudinal boundaries in the wrap defined by the segment, and wherein after writing user data to all wraps in a segment, writing user data to the wraps in an additional available segment.

* * * * *